(12) United States Patent
Williams et al.

(10) Patent No.: US 12,172,718 B2
(45) Date of Patent: *Dec. 24, 2024

(54) METHOD AND APPARATUS FOR TRANSPORTING AND STEERING A HEAVY LOAD

(71) Applicant: COLUMBIA TRAILER CO., INC., Hillsboro, OR (US)

(72) Inventors: Karl Boyd Williams, Beaverton, OR (US); Steven Andrew Csergei, Hillsboro, OR (US)

(73) Assignee: Columbia Trailer Co., Inc., Hillsboro, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/324,757

(22) Filed: May 26, 2023

(65) Prior Publication Data

US 2024/0025499 A1 Jan. 25, 2024

Related U.S. Application Data

(63) Continuation of application No. 16/543,139, filed on Aug. 16, 2019, now Pat. No. 11,661,126.

(60) Provisional application No. 62/719,343, filed on Aug. 17, 2018.

(51) Int. Cl.
| | |
|---|---|
| *B62D 57/02* | (2006.01) |
| *B66F 3/02* | (2006.01) |
| *B66F 3/08* | (2006.01) |
| *B66F 3/26* | (2006.01) |
| *B66F 3/36* | (2006.01) |
| *B66F 3/44* | (2006.01) |
| *B66F 3/46* | (2006.01) |
| *E21B 7/02* | (2006.01) |

(52) U.S. Cl.
CPC ............... *B62D 57/02* (2013.01); *B66F 3/02* (2013.01); *B66F 3/08* (2013.01); *B66F 3/26* (2013.01); *B66F 3/36* (2013.01); *B66F 3/44* (2013.01); *B66F 3/46* (2013.01); *E21B 7/02* (2013.01)

(58) Field of Classification Search
CPC ... B66F 3/46; B66F 7/20; B66F 11/04; B62D 57/00; B62D 57/02; B62D 57/032
USPC ....................... 254/2 B, 84; 180/8.1, 8.5, 8.6
See application file for complete search history.

(56) References Cited

U.S. PATENT DOCUMENTS

| | | | |
|---|---|---|---|
| 3,576,225 A * | 4/1971 | Chambers | E21B 15/003 180/8.5 |
| 8,925,658 B2 * | 1/2015 | Bryant | E21F 13/006 180/8.5 |
| 9,132,871 B2 * | 9/2015 | Crisp | E21B 15/00 |
| 10,202,156 B2 * | 2/2019 | Higginbotham, III | B62D 57/032 |
| 10,266,219 B2 * | 4/2019 | Van Raden | B62D 57/032 |

(Continued)

*Primary Examiner* — Robert F Neibaur
(74) *Attorney, Agent, or Firm* — Stoel Rives LLP

(57) ABSTRACT

A method and apparatus for transporting heavy machinery, equipment or other heavy loads from one location to another, whereby the apparatus may be constructed as a walking machine including a plurality of lifting assemblies operative to lift the load above the supporting surface and then move the load relative to the supporting surface by transporting the load via rollers or tracks in the walking machines. In one example, the lifting assemblies are provided with separate longitudinal and lateral drive mechanisms independently operative for translating the load in either or both longitudinal and lateral directions.

17 Claims, 28 Drawing Sheets

(56) References Cited

U.S. PATENT DOCUMENTS

| | | | |
|---|---|---|---|
| 10,358,876 B2* | 7/2019 | Csergei | E21B 15/003 |
| 10,793,409 B2* | 10/2020 | Unger | B66F 7/16 |
| 10,889,961 B2* | 1/2021 | Unger | B66F 3/46 |
| 10,895,882 B2* | 1/2021 | Ross | B62D 57/032 |
| 11,661,126 B2* | 5/2023 | Williams | E21B 7/02 |
| | | | 180/8.1 |
| 2015/0166134 A1* | 6/2015 | Trevithick | B62D 57/02 |
| | | | 180/8.1 |
| 2016/0280524 A1* | 9/2016 | Crisp | B62D 5/28 |
| 2017/0036716 A1* | 2/2017 | Van Raden | E21B 15/003 |

* cited by examiner

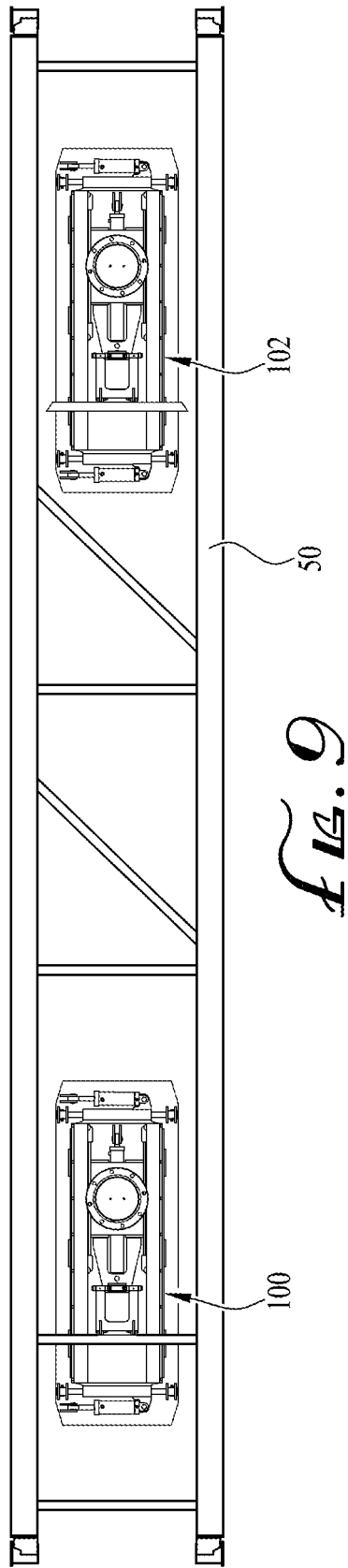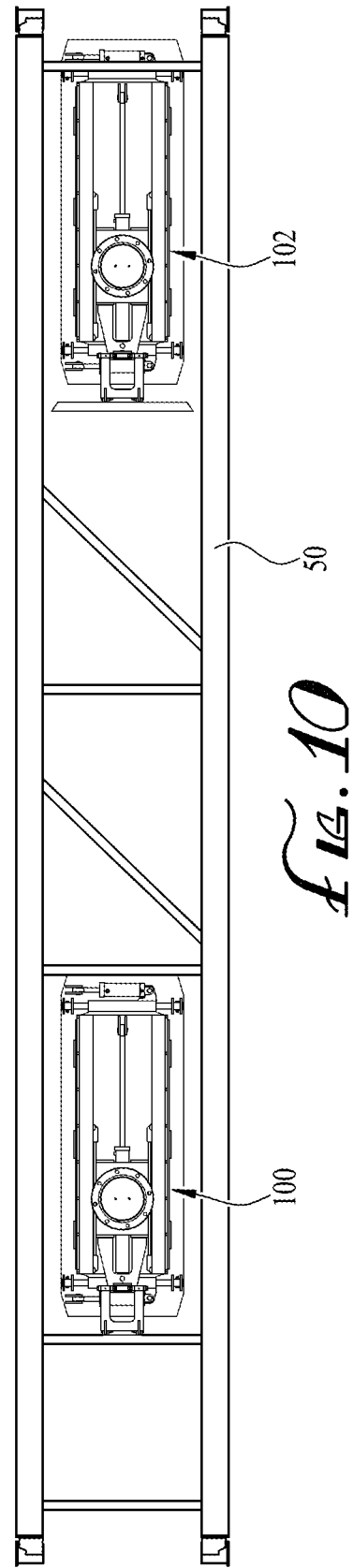

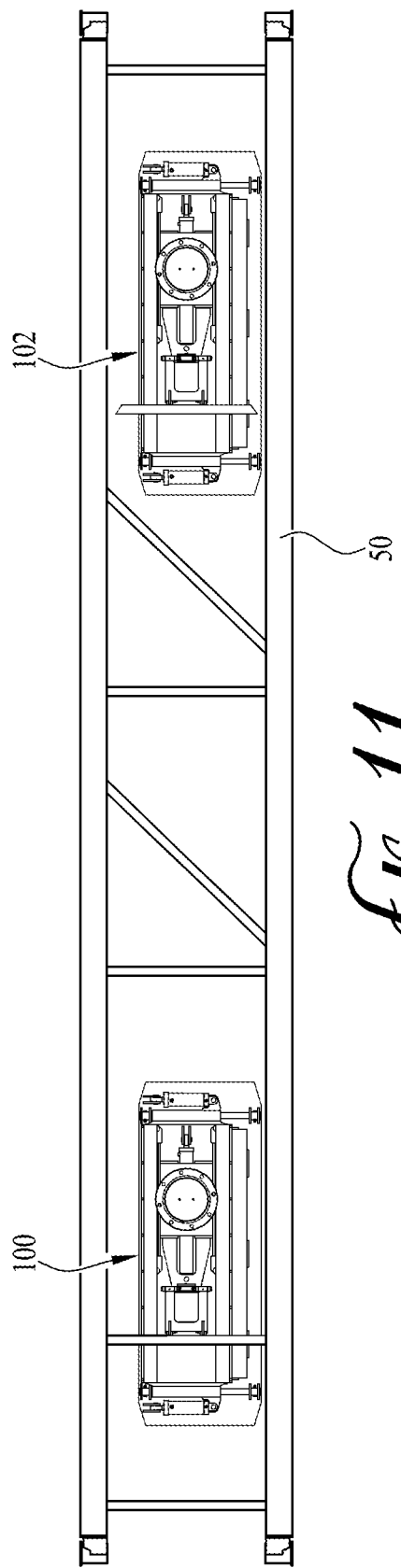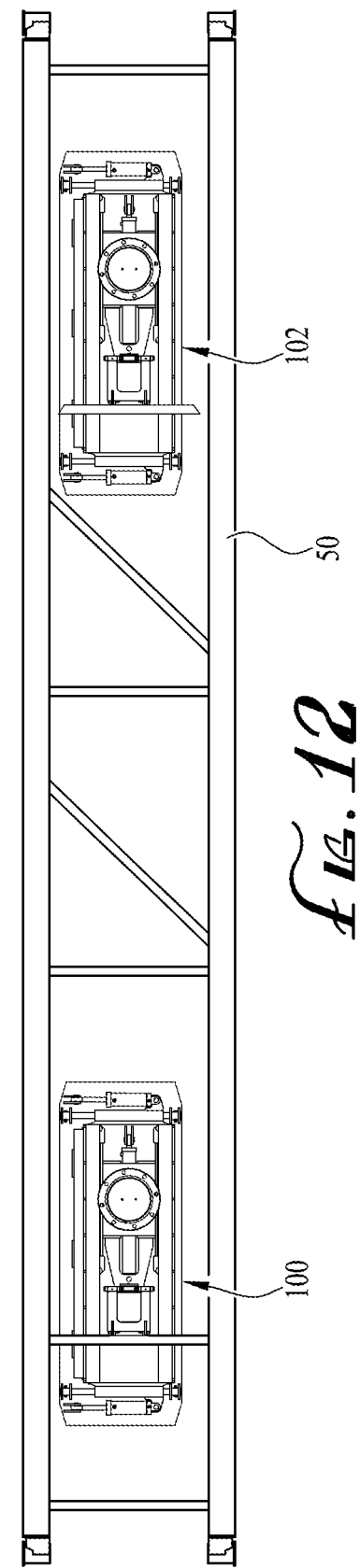
Fig. 11
Fig. 12

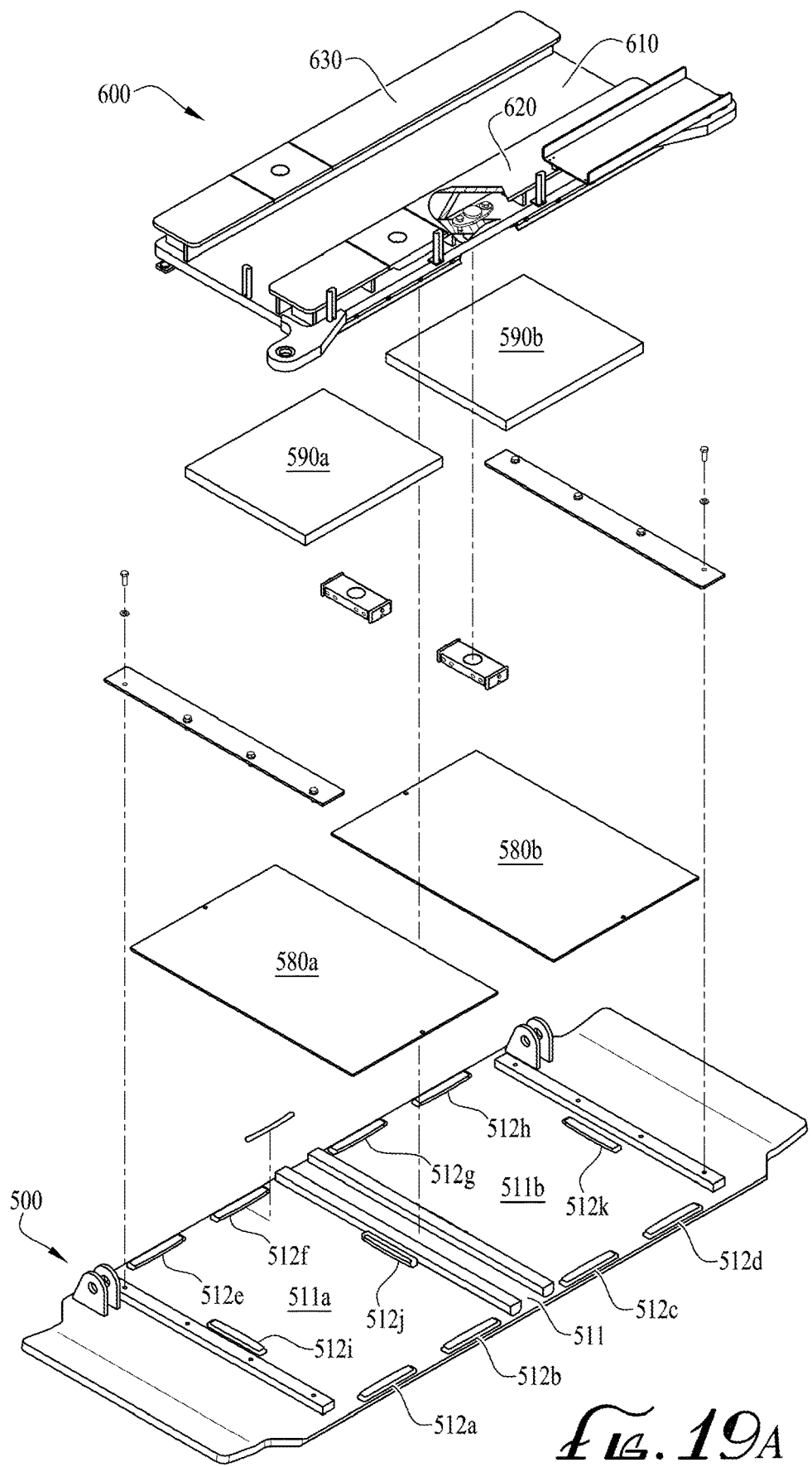

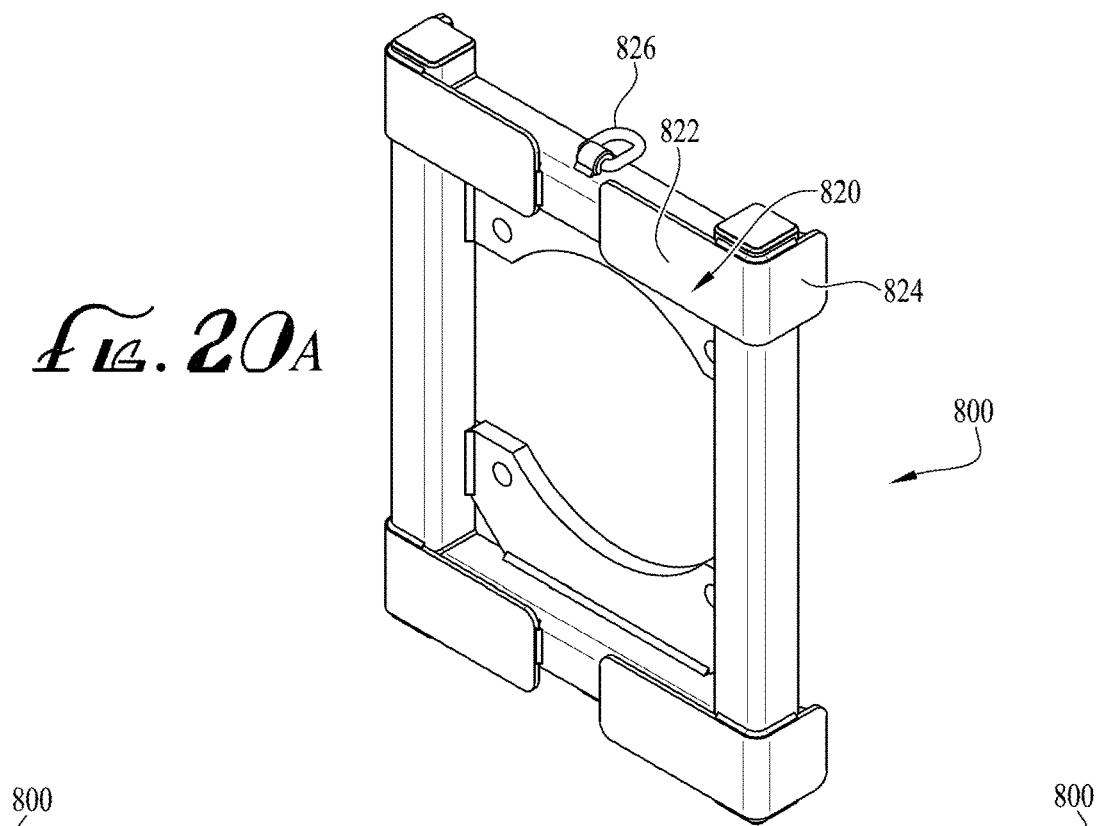
FIG. 20A
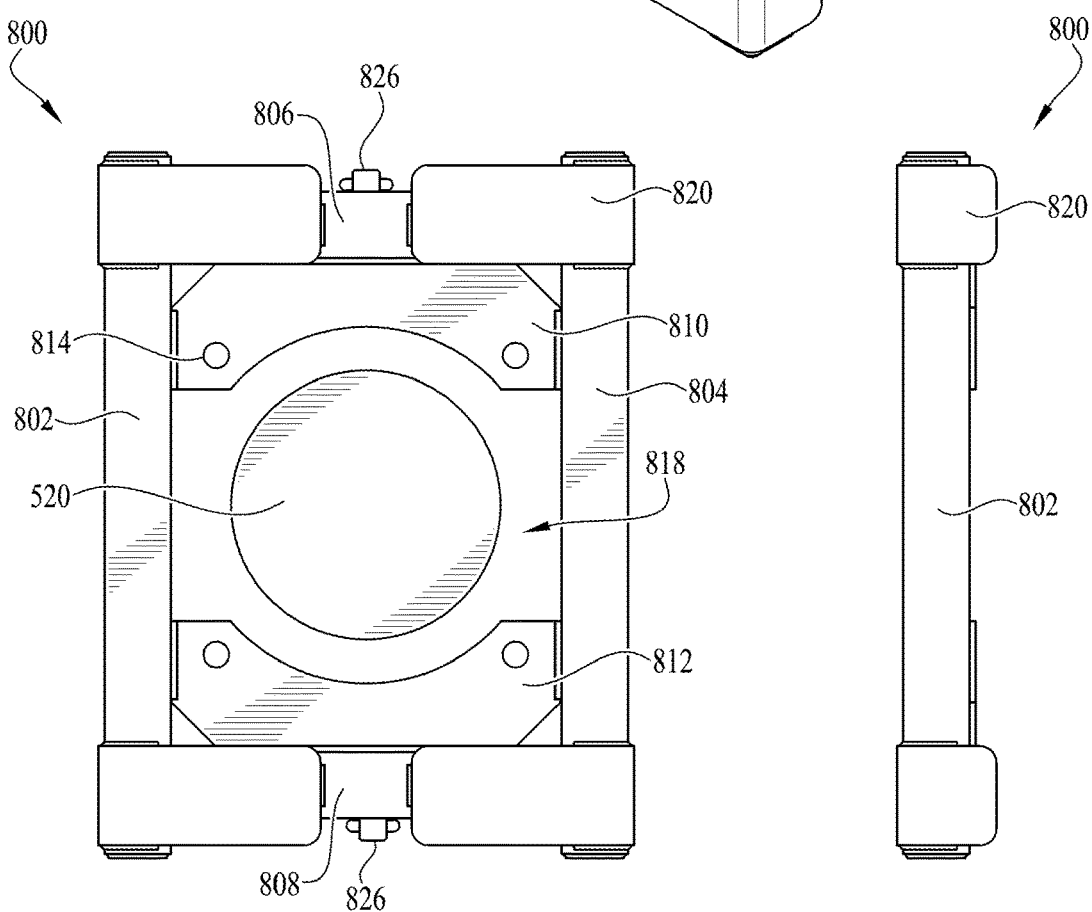
FIG. 20B
FIG. 20C

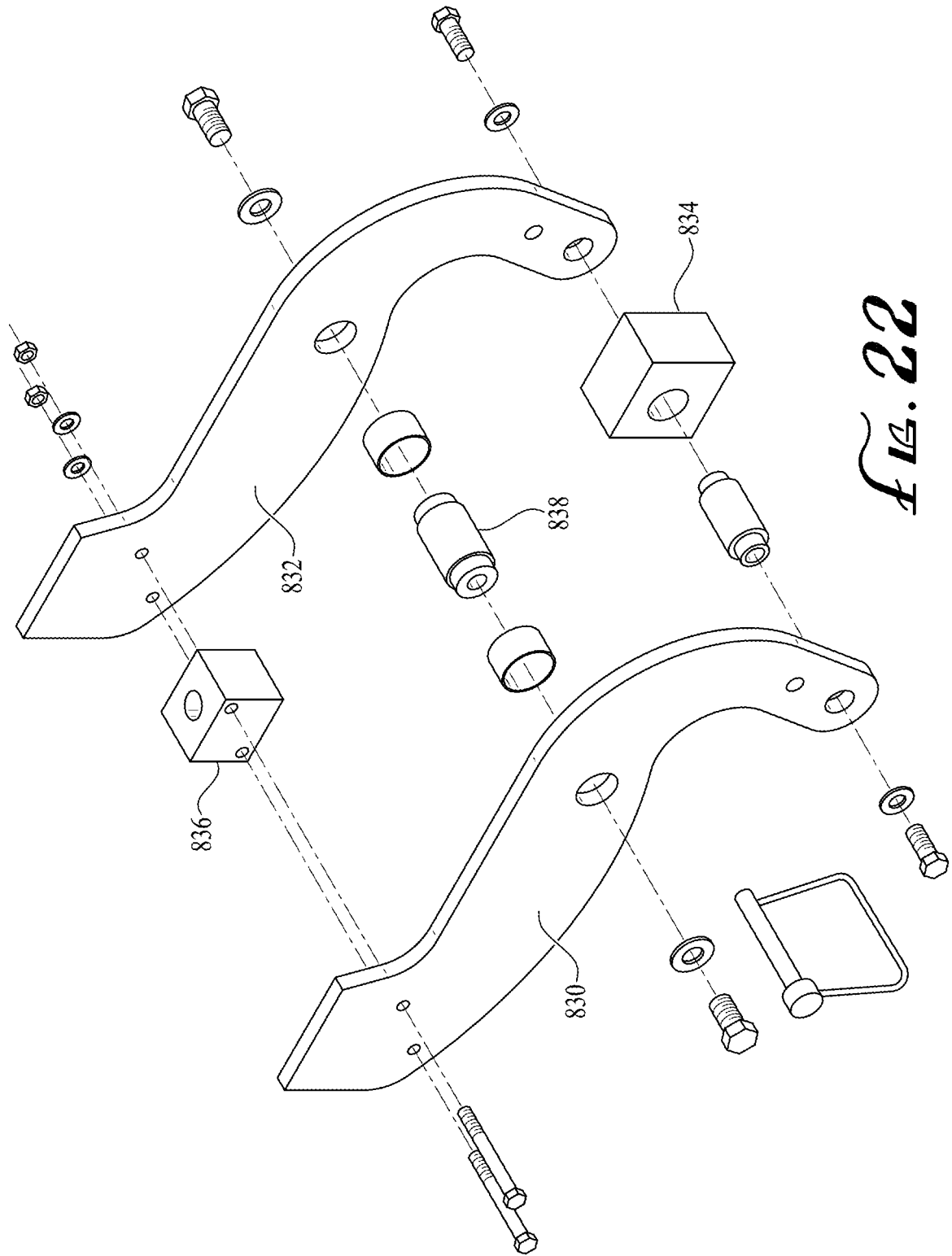

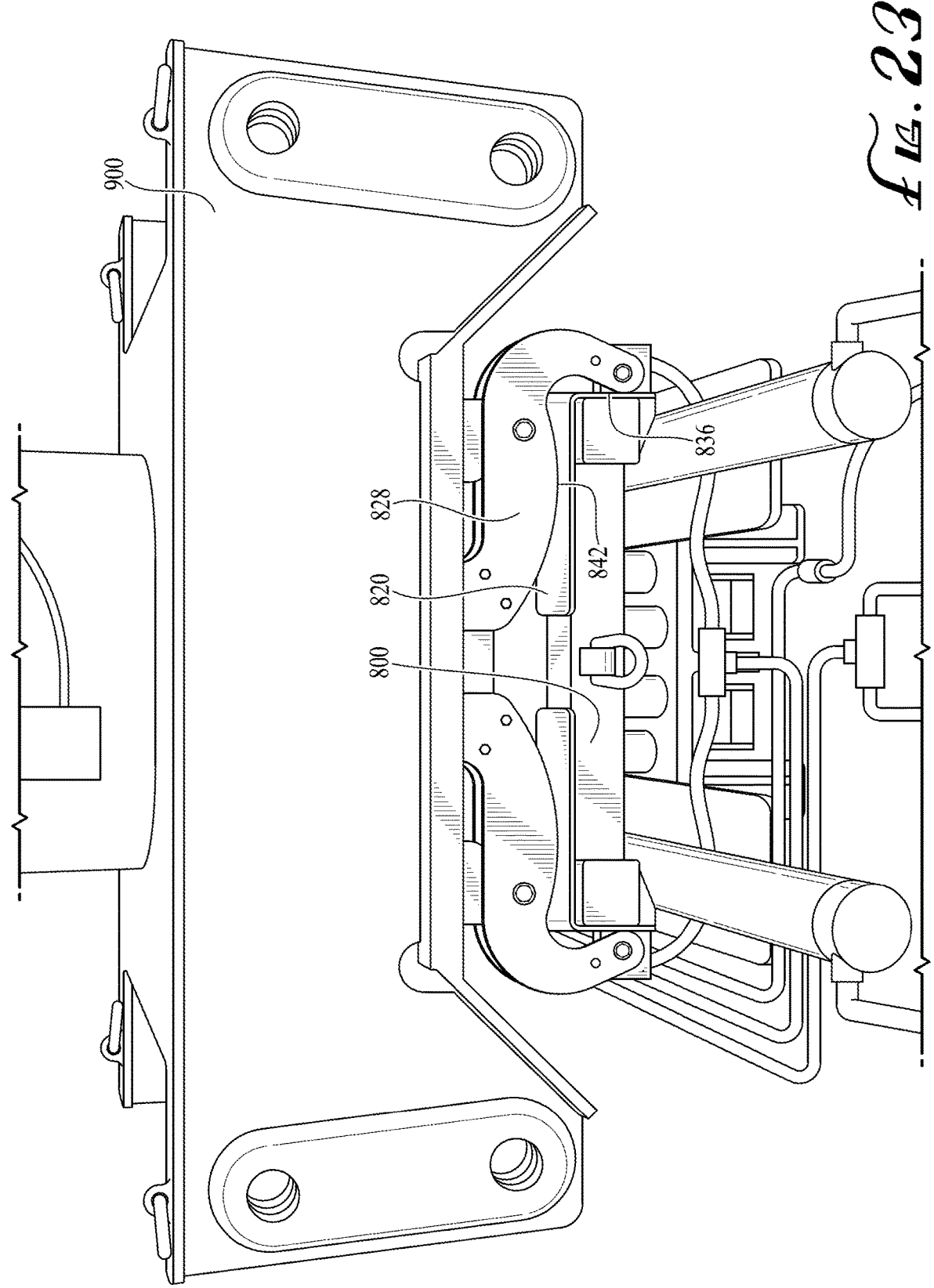

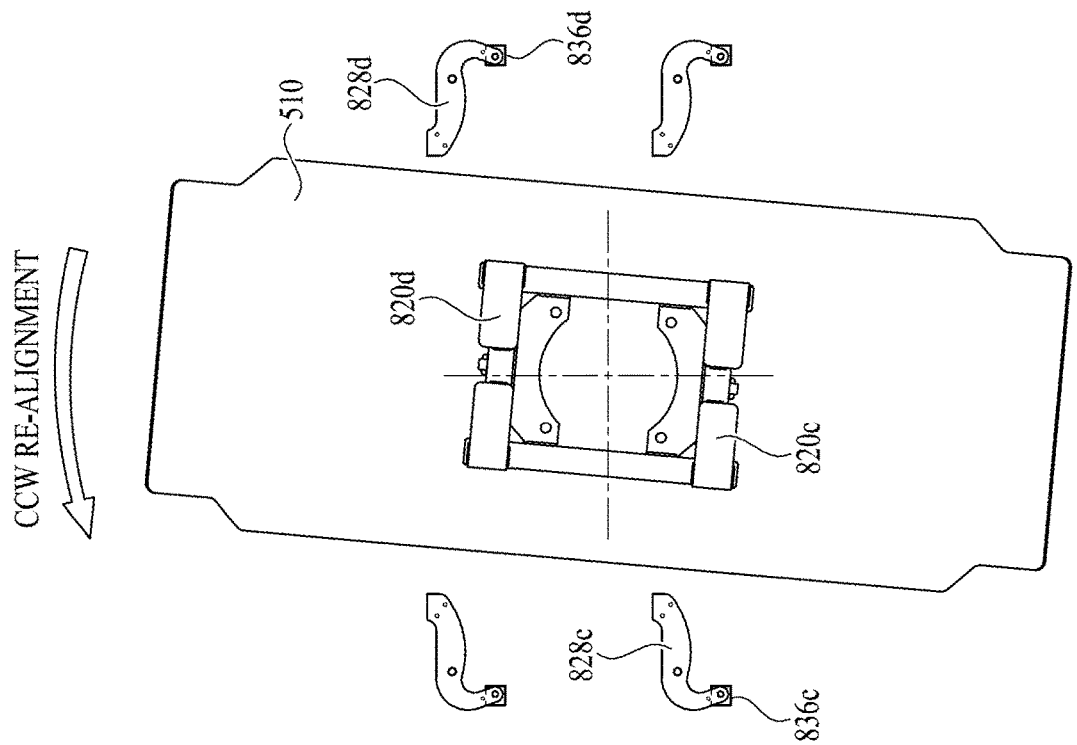
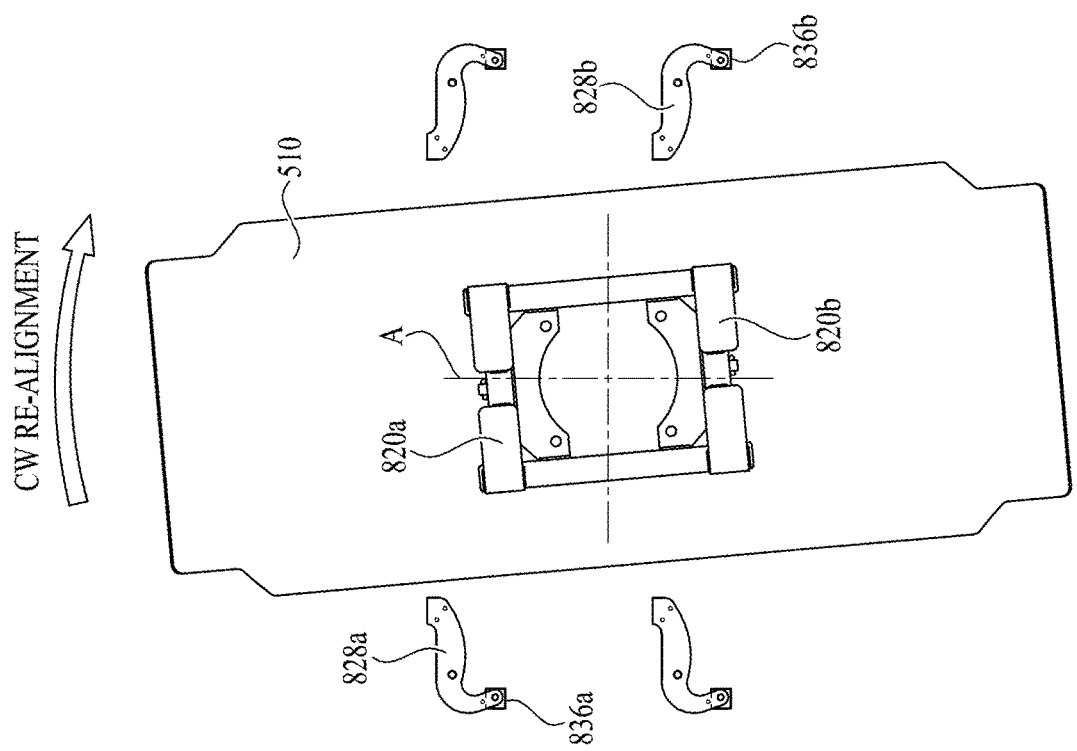

STEP 2

LIFT CYLINDER EXTENDED 3 INCHES. CONTACT REMOVED BETWEEN CENTERING FIXTURE AND BEARING BLOCK.

STEP 1

LIFT CYLINDER FULLY RETRACTED. BEARING BLOCKS IN CONTACT WITH CENTERING FIXTURE

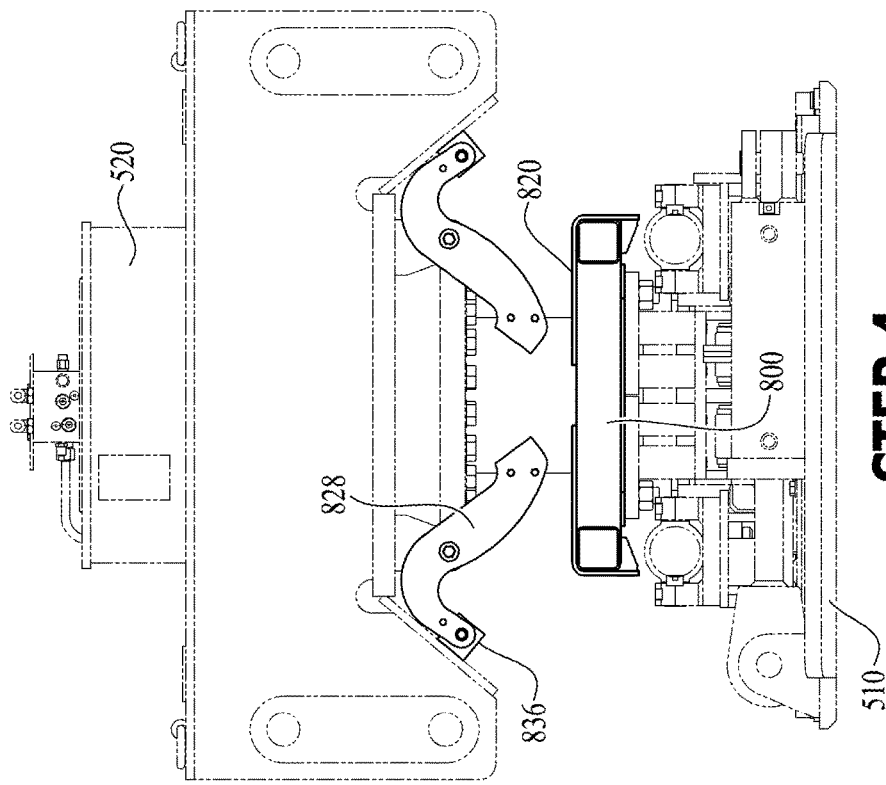
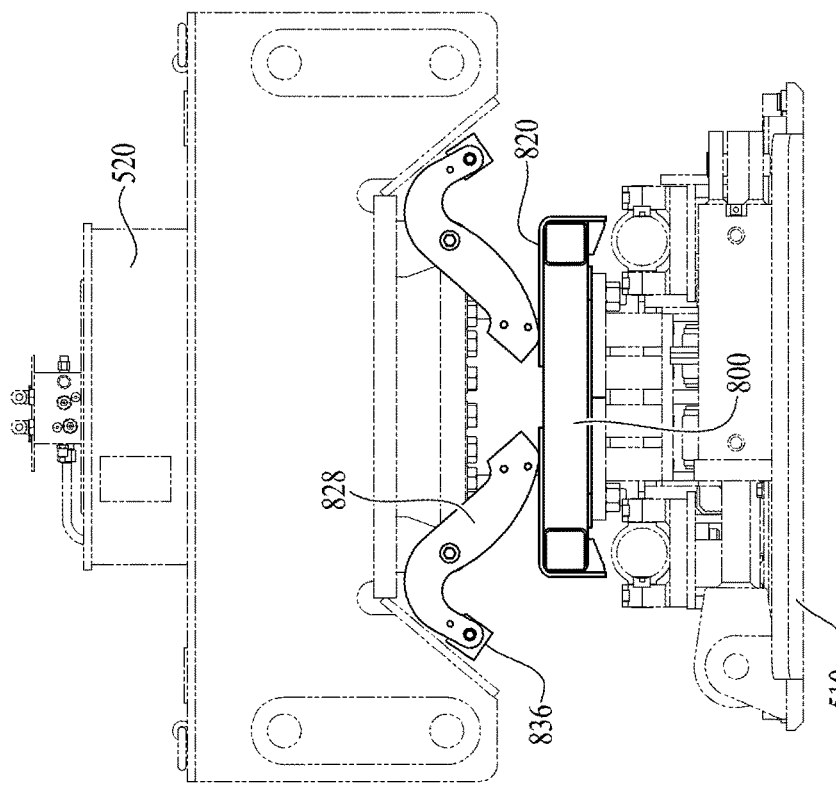

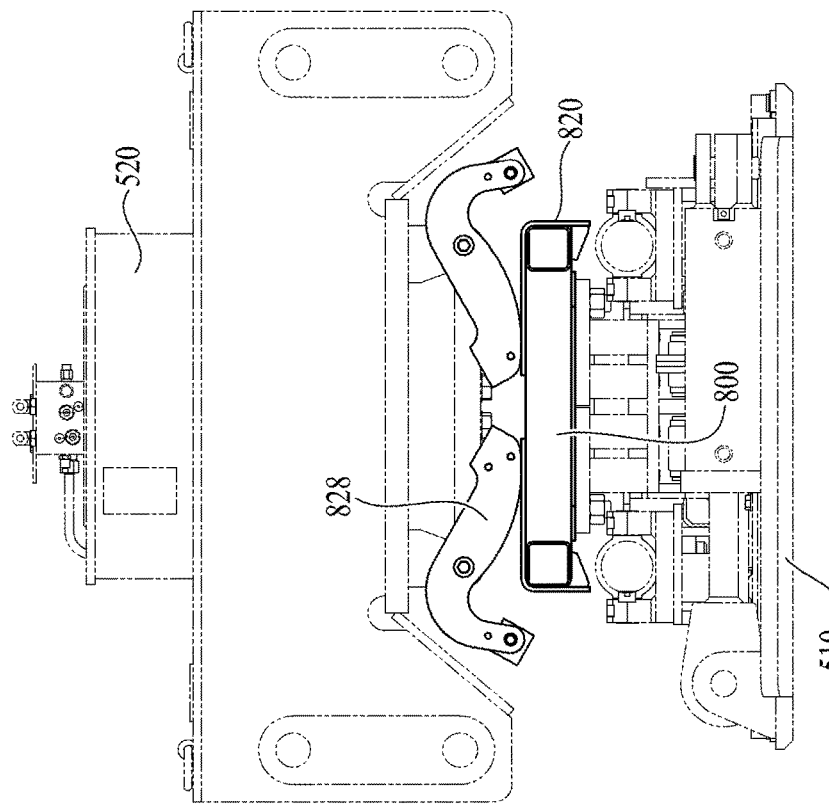
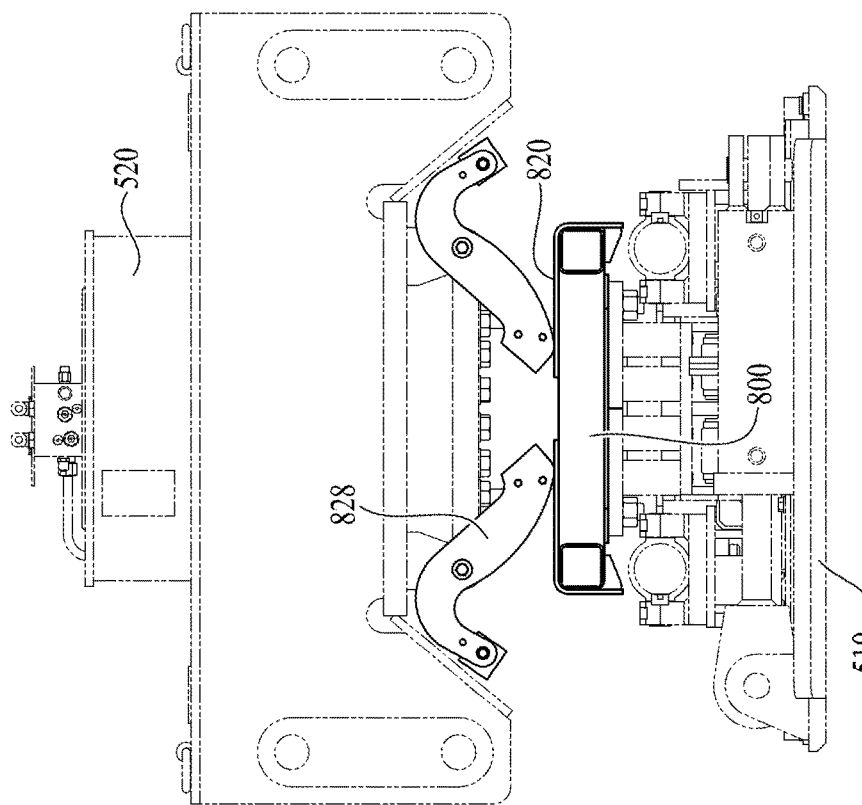

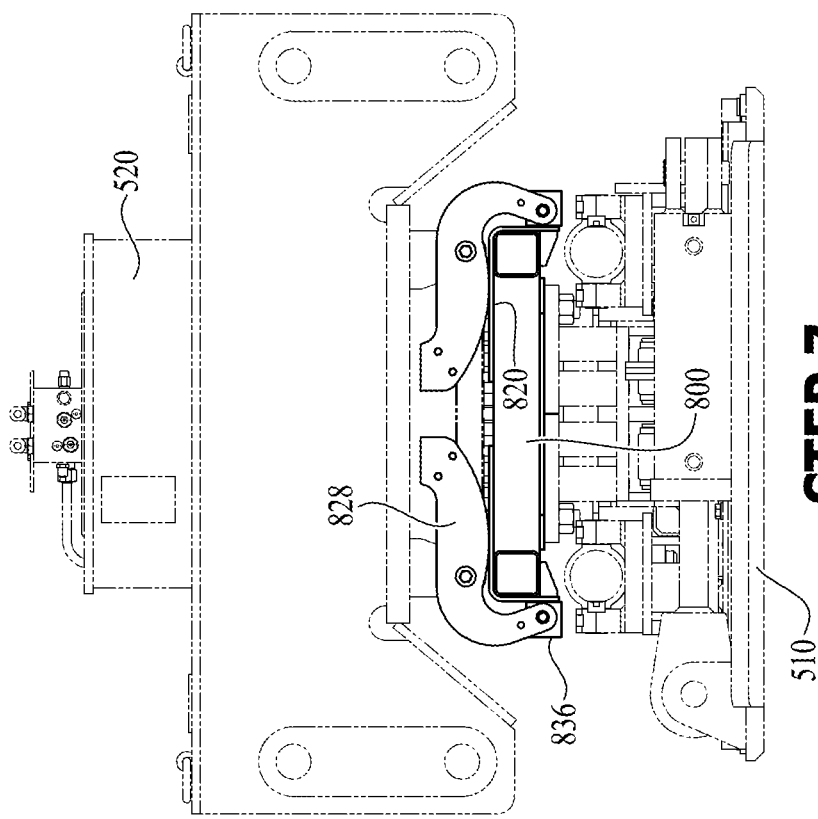

METHOD AND APPARATUS FOR TRANSPORTING AND STEERING A HEAVY LOAD

RELATED APPLICATION DATA

This application is a nonprovisional of and claims the benefit under 35 U.S.C. § 119(e) of U.S. Provisional Patent Application No. 62/719,343, filed Aug. 17, 2018, the disclosure of which is incorporated by reference herein in its entirety.

BACKGROUND

The field of the present invention is related to a class of transportation machines commonly referred to as "walking machines," which are large, typically non-wheeled, power-driven structures operable for transporting heavy loads (e.g., loads weighing upwards of several thousand tons) over a road or other ground surface. These machines, and the heavy substructures in themselves, are fabricated from steel and other high-strength materials and find particular use in carrying and sequentially transporting large structures. For example, a walking machine may be used to transport oil drilling rigs and position them over a drilling well bore in a new field undergoing exploration for oil, or over existing well bores in an old, established field.

Instead of using ground-contacting wheels to move the heavy loads, these walking machines typically comprise a plurality of lifting assemblies that use hydraulic lift cylinders to lift the load above the supporting surface and then move the load relative to the supporting surface by transporting the load via rollers or tracks in the walking machines.

In order to position the oil rig or other heavy load in a precise position, these walking machines may be provided with a steering mechanism whereby the walking machine unit may be rotated or steered to a desired position. U.S. Pat. No. 6,581,525, the disclosure of which is incorporated by reference herein, provides additional details relating to walking machine systems and methods for moving heavy loads. The '525 patent also discloses a steering system for a walking machine in which a substructure of the walking unit may be disengaged and rotated relative to its upper structure thus repositioning the substructure for travel at a desired steered angle. U.S. Published Application No. 2017/0022765 discloses a walking machine unit with an improved steering system. The present inventor has recognized that these steering systems have room for improvement.

SUMMARY

The present disclosure is directed to apparatus and methods for transporting heavy machinery, equipment or other heavy load from one location to another, whereby the apparatus is constructed to transport the load in multiple directions in order to move the load in a desired path to a set position. An example embodiment is directed to a walking machine comprising a plurality of lifting assemblies operative to lift the load above the supporting surface and then move the load relative to the supporting surface (e.g., the road or other ground surface) by transporting the load via rollers or tracks in the walking machines. In one embodiment, the lifting assembly may include transport mechanisms operative for transporting the load in multiple directions—in one example both a first direction (e.g., longitudinally) and a second direction (e.g., laterally)—so that lifting assemblies may be driven or steered in a desired walking direction or along a desired directional path. In another example embodiment, a walking machine is provided with an improved re-centering system whereby the load being transported can be quickly and efficiently re-centered after each movement to ensure that the load is properly centered and stabilized before the load is subsequently moved. Additional aspects and advantages will be apparent from the following detailed description of example embodiments, which proceeds with reference to the accompanying drawings.

BRIEF DESCRIPTION OF THE DRAWINGS

FIGS. 9-12 are each a top plan view of one side of the walking machine system of FIG. 8, illustrating two walking units. In FIG. 9, the walking units are in a first longitudinal position and central lateral position; in FIG. 10, the walking units are in a forward extended position and central lateral position; in FIG. 11, the walking units are in the first (rearward) longitudinal position and right side lateral position; in FIG. 12, the walking units are in the first (rearward) longitudinal position and left side lateral position.

FIG. 16 is a partially exploded isometric view of the walking machine unit of FIGS. 14 and 15.

FIGS. 19A, 19B, and 19C are partially exploded views of a walking machine unit according to another embodiment.

FIGS. 20A, 20B, and 20C illustrate views of an embodiment of a centering fixture or frame.

FIGS. 21A, 21B, and 22 illustrate an embodiment of a centering pivot arm according to one embodiment.

FIG. 23 illustrates an embodiment of a walking machine unit according to one embodiment.

FIGS. 24A and 24B are schematic illustrations representing an example operation of the centering pivot arm of FIG. 21 for realigning a foot section of the walking machine unit of FIG. 23.

FIGS. 25A, 25B, 25C, 25D, 25E, 25F, and 25G collectively illustrate a walking cycle of the walking machine unit in accordance with one embodiment.

DETAILED DESCRIPTION OF EMBODIMENTS

With reference to the drawings, this section describes particular example embodiments and their detailed construction and operation. To facilitate description, any element numeral representing an element in one figure will be used to represent the same element when used in any other figure. The embodiments described herein are set forth by way of illustration only and not limitation. It should be recognized in light of the teachings herein that there is a range of equivalents to the example embodiments described herein. Notably, other embodiments are possible, variations can be made to the embodiments described herein and there may be equivalents to the components, parts, or steps that make up or augment the described embodiments.

The described features, structures, characteristics, and methods of operation may be combined in any suitable manner in one or more embodiments. In view of the disclosure herein, those skilled in the art will recognize that the various embodiments can be practiced without one or more of the specific details or with other methods, components, materials, or the like. In other instances, well-known structures, materials, or methods of operation are not shown or not described in detail to avoid obscuring more pertinent aspects of the embodiments.

Figure 8:
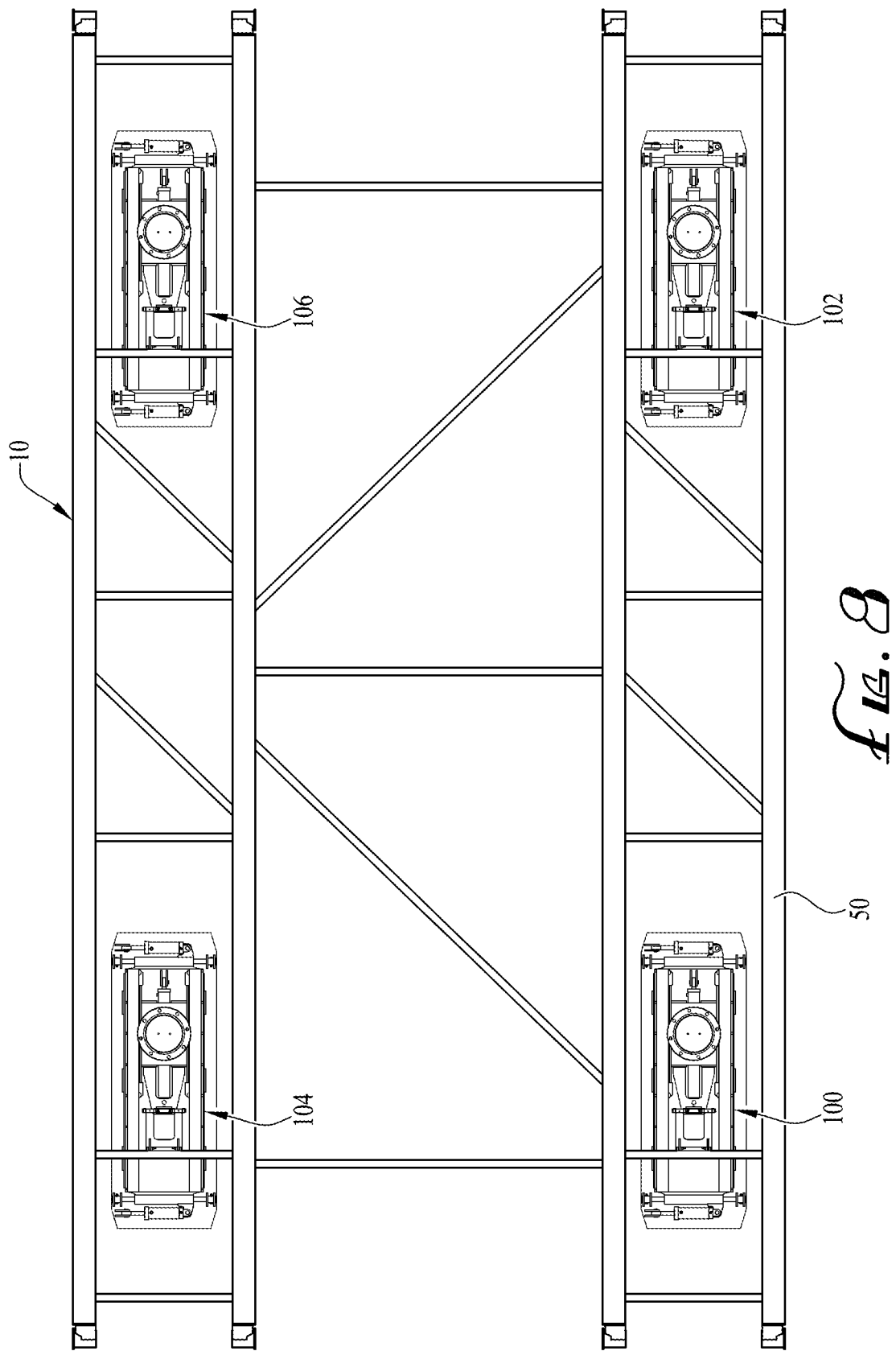
FIG. 8 is a top plan view of a walking machine system according to an example embodiment, with four walking machine units, one disposed at each of the four corners of the oil rig.

FIGS. 1-7 are a series of schematic drawings illustrating an example walking machine system for moving an oil rig 10 (or other large support structure) along a ground surface 5. The oil rig 10 is supported at the ground surface 5 by a plurality of support legs 55 attached to the bottom support structure 50. The walking machine system includes a set of four lifting assemblies (or lifting machine units), with a lifting assembly or unit arranged in position proximate each of the corners of the oil rig 10. Two lifting assemblies 100, 102 are visible in FIGS. 1-7 and the other two lifting assemblies 104, 106 are illustrated in FIG. 8 described below. The lifting assemblies 100, 102, 104, 106 may be supported via a longitudinal beam (as shown) or other configuration such as via a horizontal beam. Though four lifting assemblies are shown, the system may include additional lifting assemblies.

Figure 1:
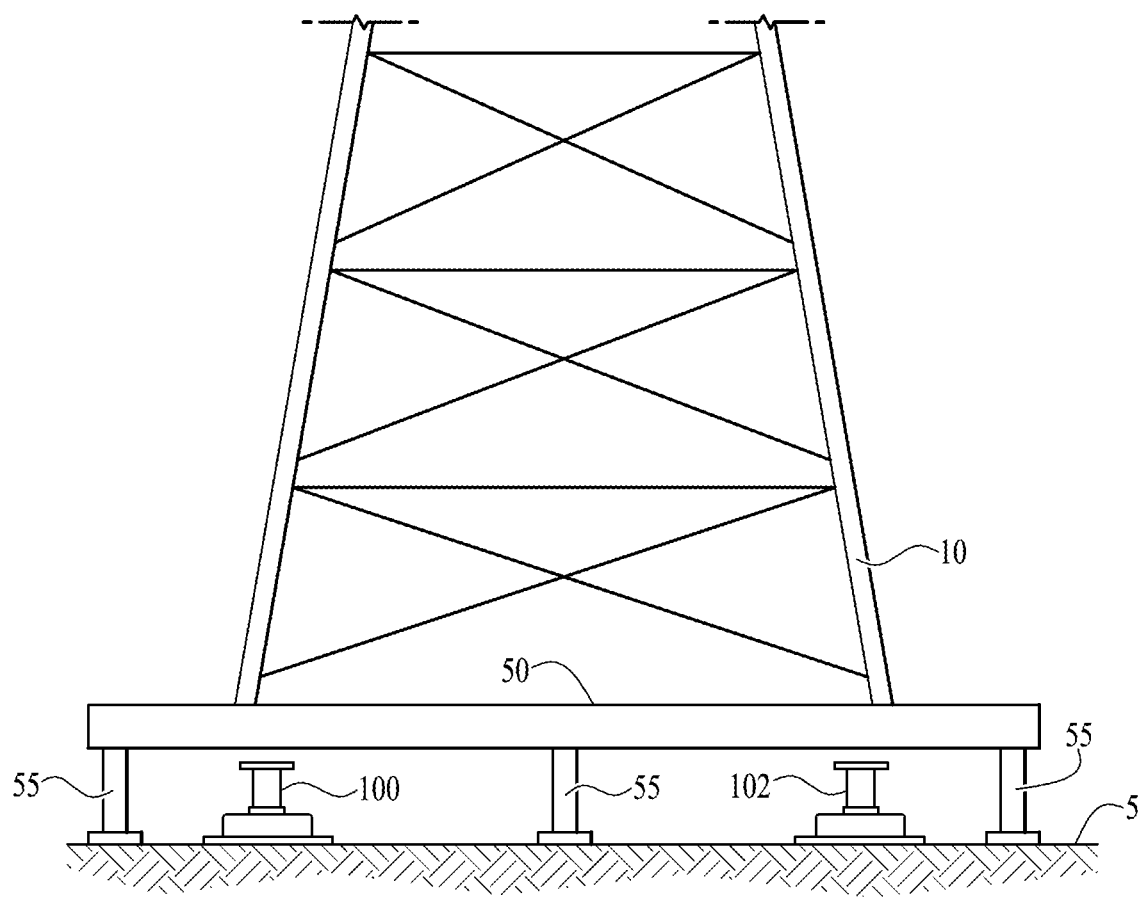
FIG. 1 is a diagrammatic view of an example walking machine system for moving a large support structure, such as an oil rig.
Figure 2:
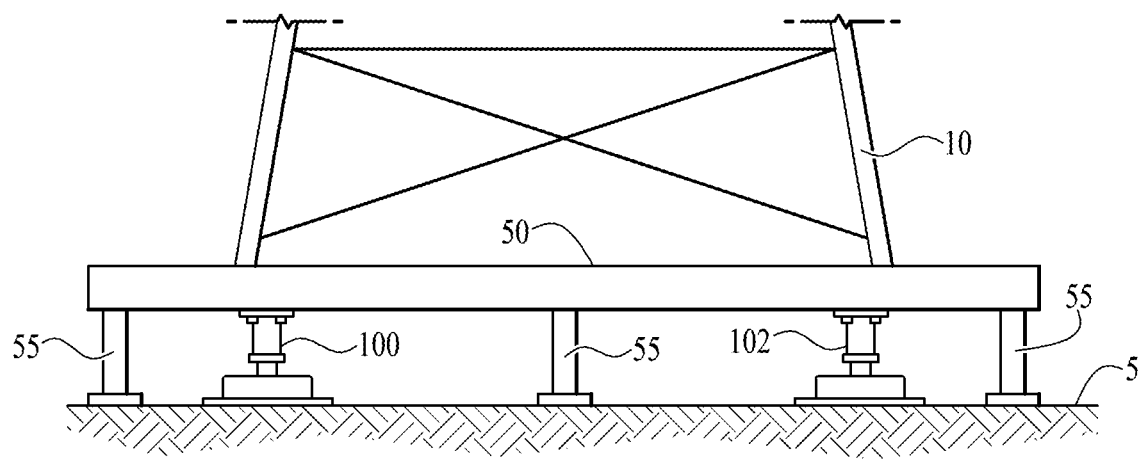
FIG. 2 is a partial view of the walking machine system of FIG. 1 with two walking machine units in position underneath and connected to the oil rig.
Figure 3:
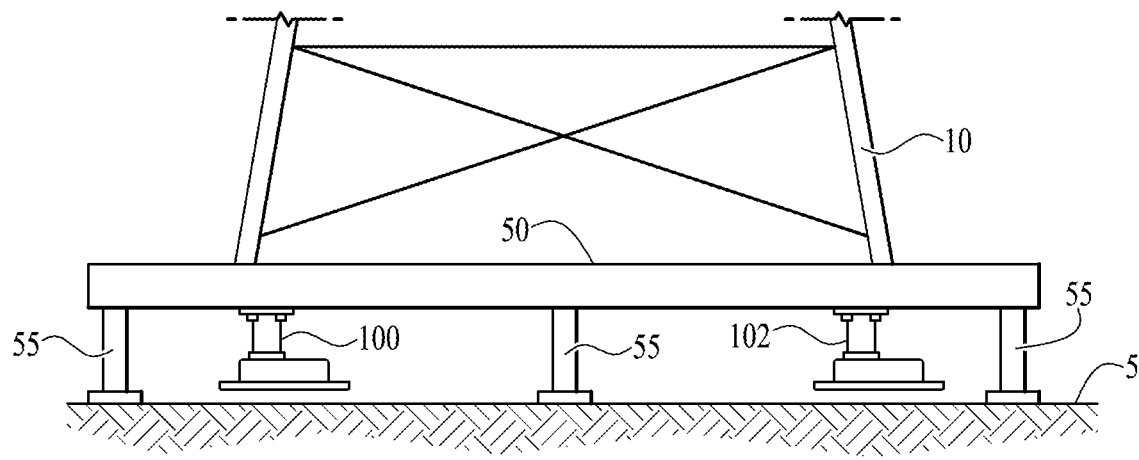
FIGS. 3-7 are partial views of the walking machine system of FIG. 1 illustrating an example operation of the walking machine units.
Figure 4:
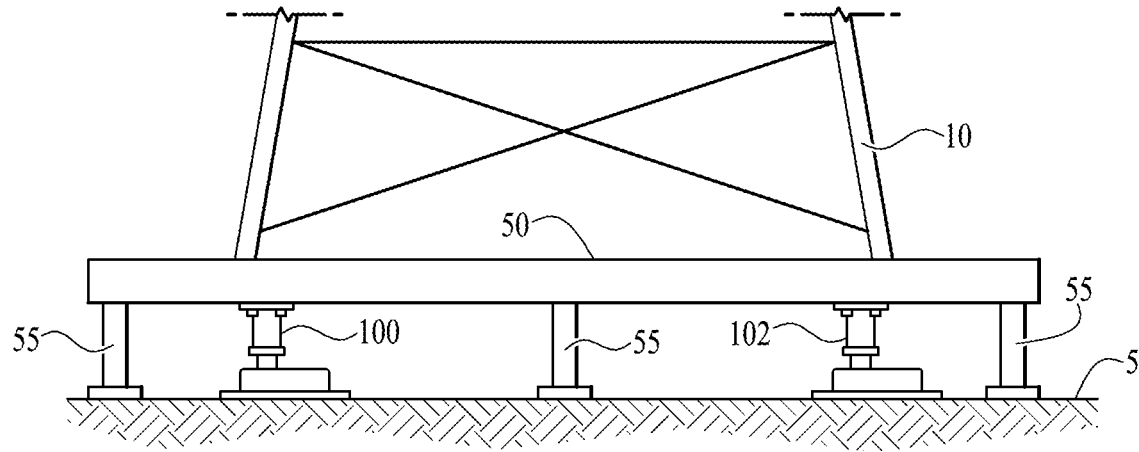
Figure 5:
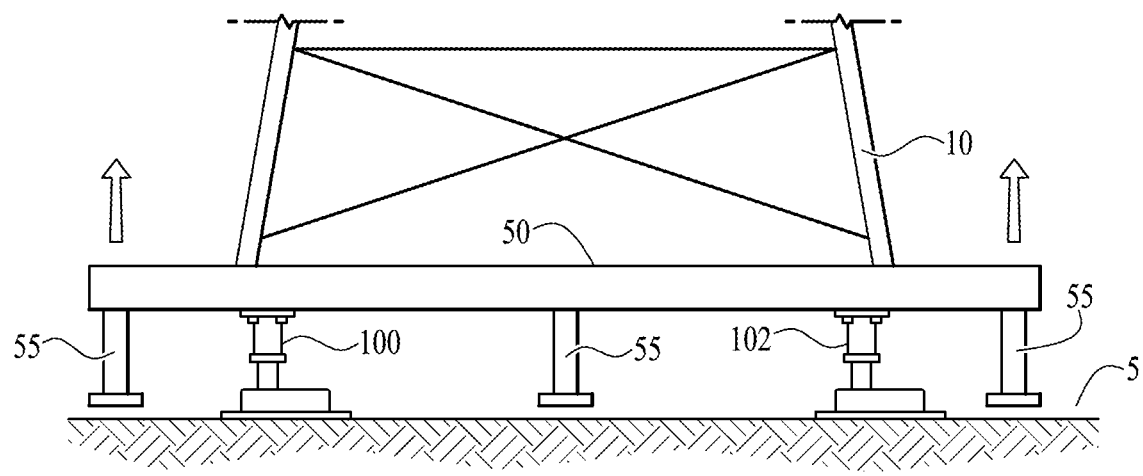
Figure 6:
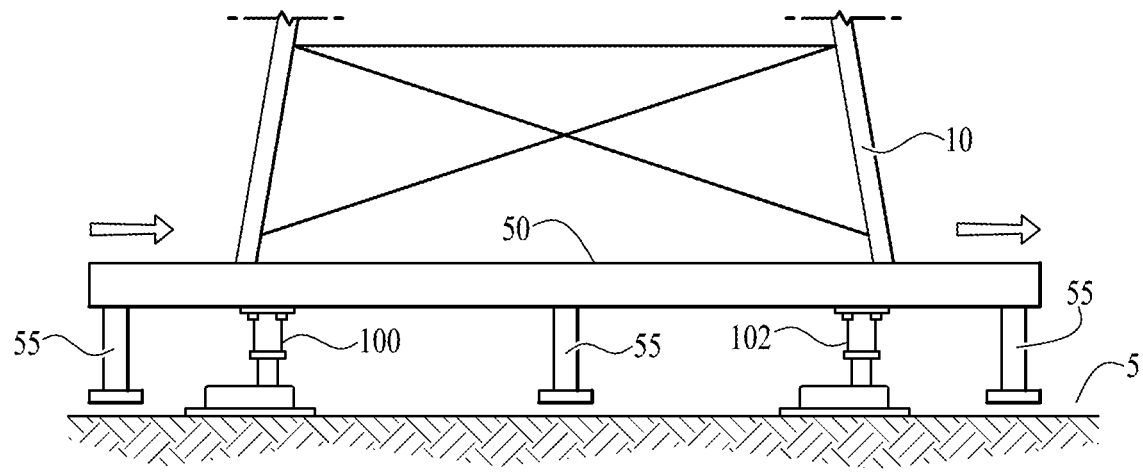
Figure 7:
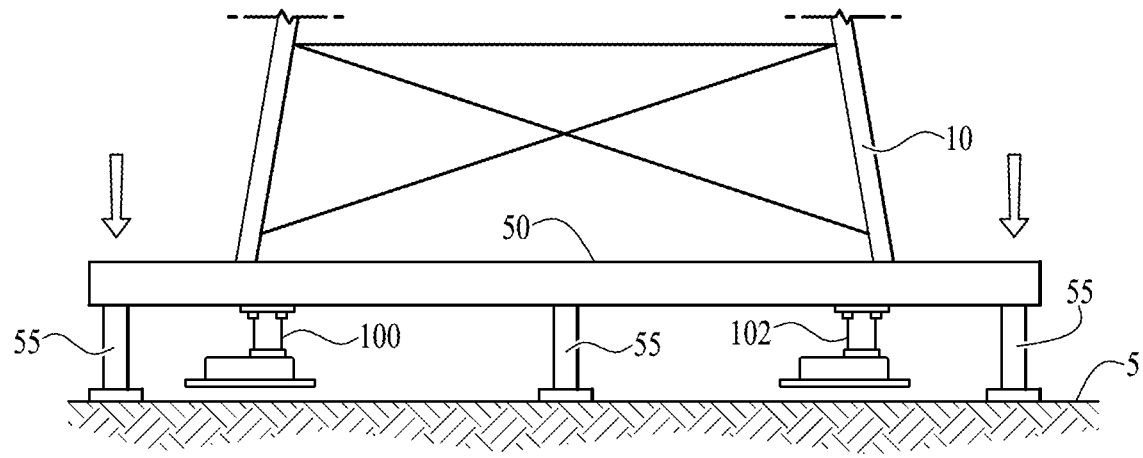

Operation of the lifting assemblies 100, 102, 104, 106 is now described with respect to a first lifting assembly 100 with the understanding that the same description applies equally to lifting assemblies 102, 104, 106. For initial installation, the lifting assembly 100 is set in position on the ground as in FIG. 1 with its lifting cylinder retracted and not contacting the oil rig 10. The lifting cylinder of the lifting assembly 100 is raised partway as in FIG. 2 to contact the oil rig support beam/structure 50. The lifting assembly 100 is then connected to the beam/structure 50 via a suitable fastener mechanism (e.g., attachment bolts are visible in FIG. 2) or other suitable attachments. The lifting cylinder is then retracted, thereby lifting the lower structure or jack pad of the lifting assembly 100 off the ground (due to its attachment to the support beam 50 of the oil rig 10), and then the lifting assembly lower structure and foot pad are driven forward by a first push-pull mechanism to the forward position as in FIG. 3. The lifting cylinder is then partially extended, lowering the lifting assembly lower structure and jack pad to the ground as shown in FIG. 4. The lifting cylinder is then raised to the extended position thereby lifting the support structure 50 and support legs 55 of the oil rig 10 off the ground as in FIG. 5. Once the oil rig 10 is lifted, the lifting assembly lower structure (the foot) is driven rearward by the first push-pull mechanism to the rearward position, thereby moving the rig 10 forward as in FIG. 6. The lifting cylinder is then retracted, lifting the assembly lower structure off the ground as in FIG. 7, after which the assembly lower structure may then be driven forward to the position as in FIG. 3. The process steps are then repeated.

In one embodiment, a second push-pull mechanism, operating separately or in combination with the first (longitudinal) push-pull mechanism, provides for lateral drive motion. In any event, the second (lateral) push-pull mechanism is operable independently from the first (longitudinal) push-pull mechanism enabling for lateral motion with or without longitudinal motion.

Further details of the lifting assembly and push-pull mechanisms will now be described. FIG. 8 illustrates a top plan view of the walking machine system comprised of the four walking machine units 100, 102, 104, 106 with the oil rig 10 removed and showing support structure 50. The walking machine units 100, 102, 104, 106 in FIG. 8 are illustrated in a first longitudinal (non-extended) travel position, and laterally centered.

Figure 13:
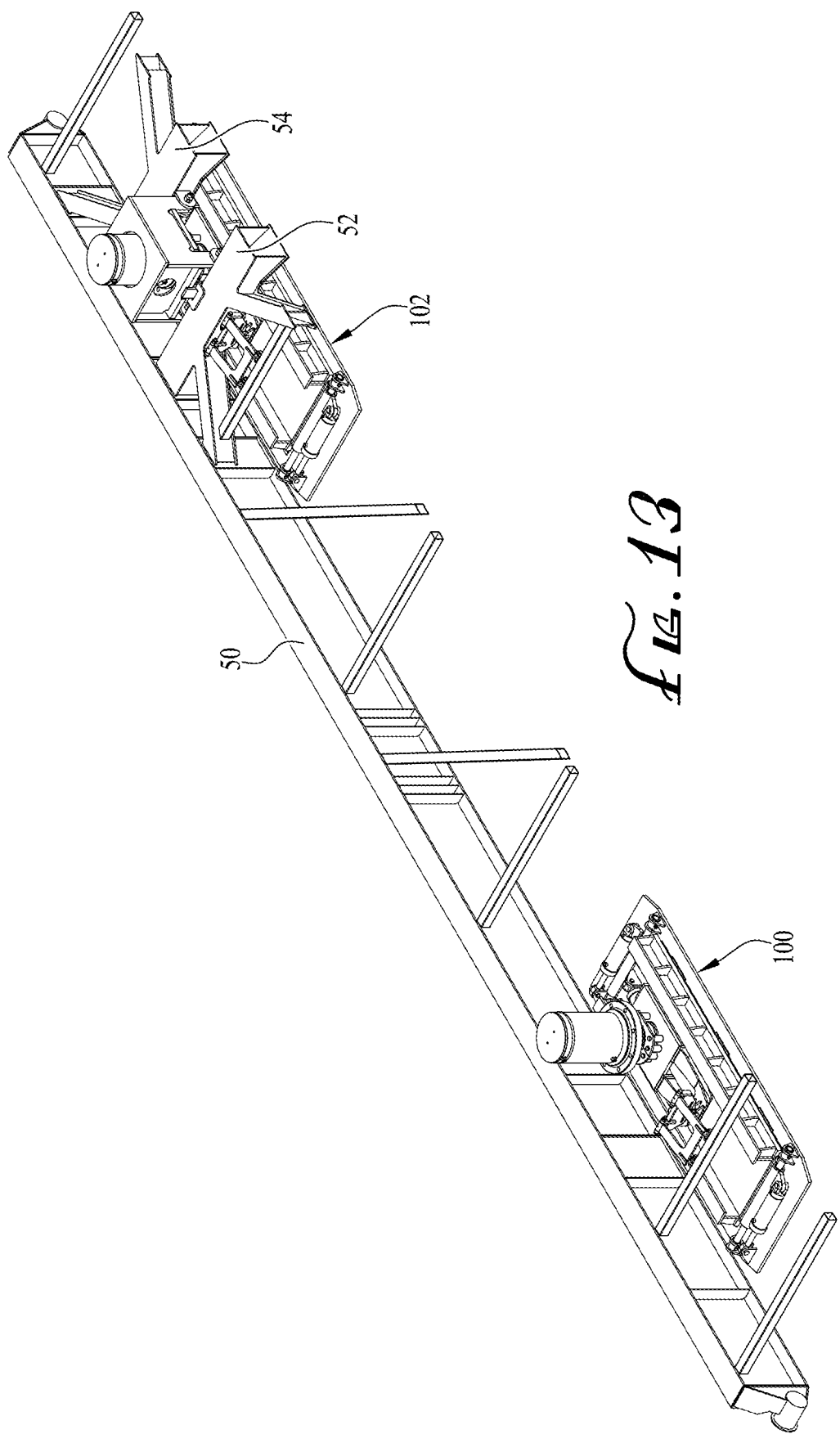
FIG. 13 is a top isometric view of the walking machine units of FIG. 9.
Figure 10:
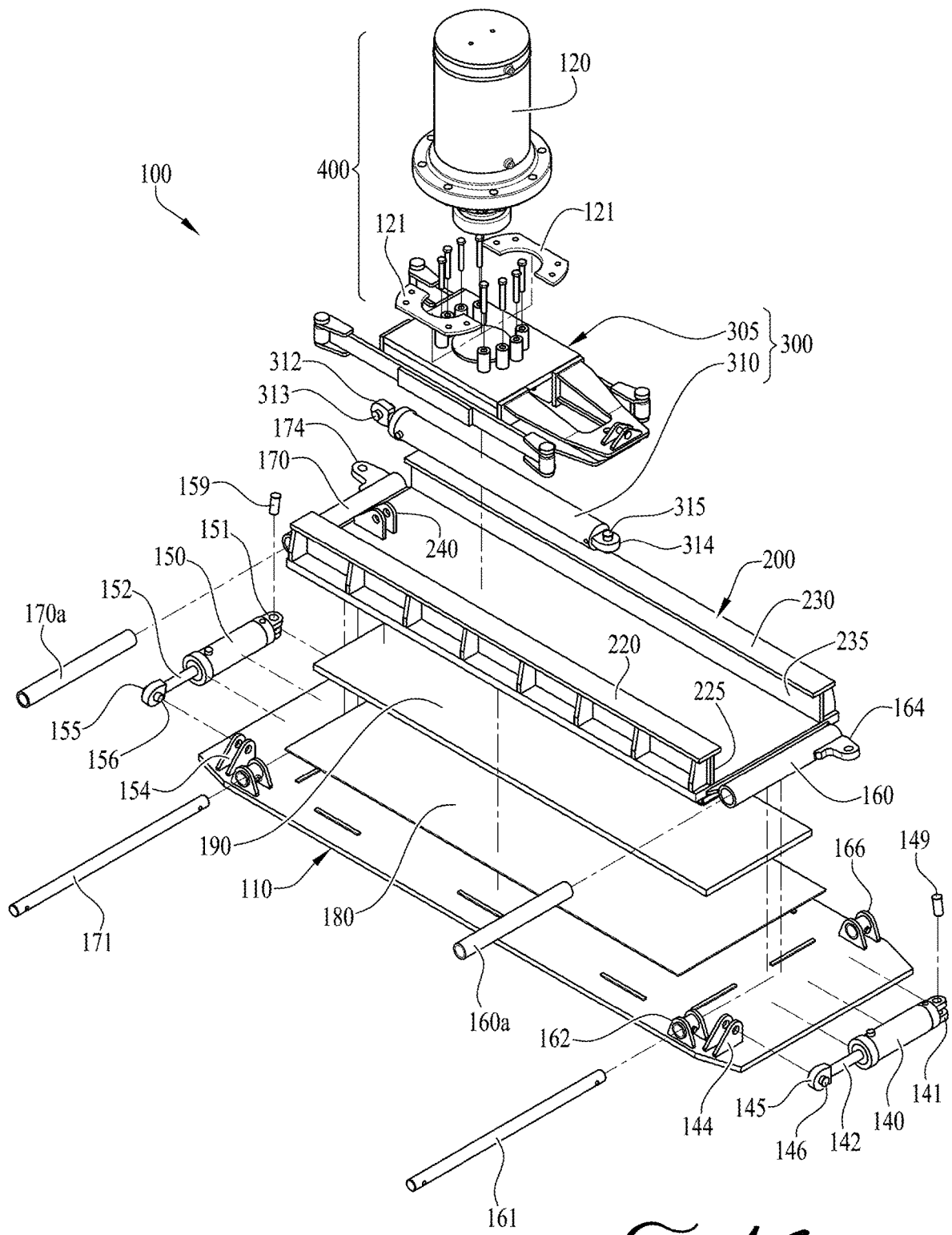

FIGS. 9-13 illustrate one side of the walking machine system and two of the walking machine units 100, 102 in various positions. In FIGS. 9 and 13, the walking machine units 100, 102 are illustrated in the first longitudinal, non-extended or rearward, travel position, and laterally centered (similar to FIG. 8). The isometric view of FIG. 13 further illustrates the forward walking machine unit disposed within the cross beams 52, 54 of the support structure 50 and also illustrates the rear lifting assembly with cross beams of the support structure 50 removed. In FIG. 10, the walking machine units 100, 102 are illustrated in the second longitudinal, forward-extended, travel position, and laterally centered. In FIG. 11, the walking machine units 100, 102 are illustrated in the first longitudinal, non-extended or rearward, travel position, and laterally to the right side. In FIG. 12 the walking machine units 100, 102 are illustrated in the first longitudinal, non-extended or rearward, travel position, and laterally to the left side. Though not shown, the walking machine units may be translated into the second longitudinal, forward-extended, travel position, and laterally translated to the left or right. The following sections describe additional details relating to the walking machines units 100, 102, 104, 106 and their various components for supporting the movement of the overall walking machine system.

Figure 14:
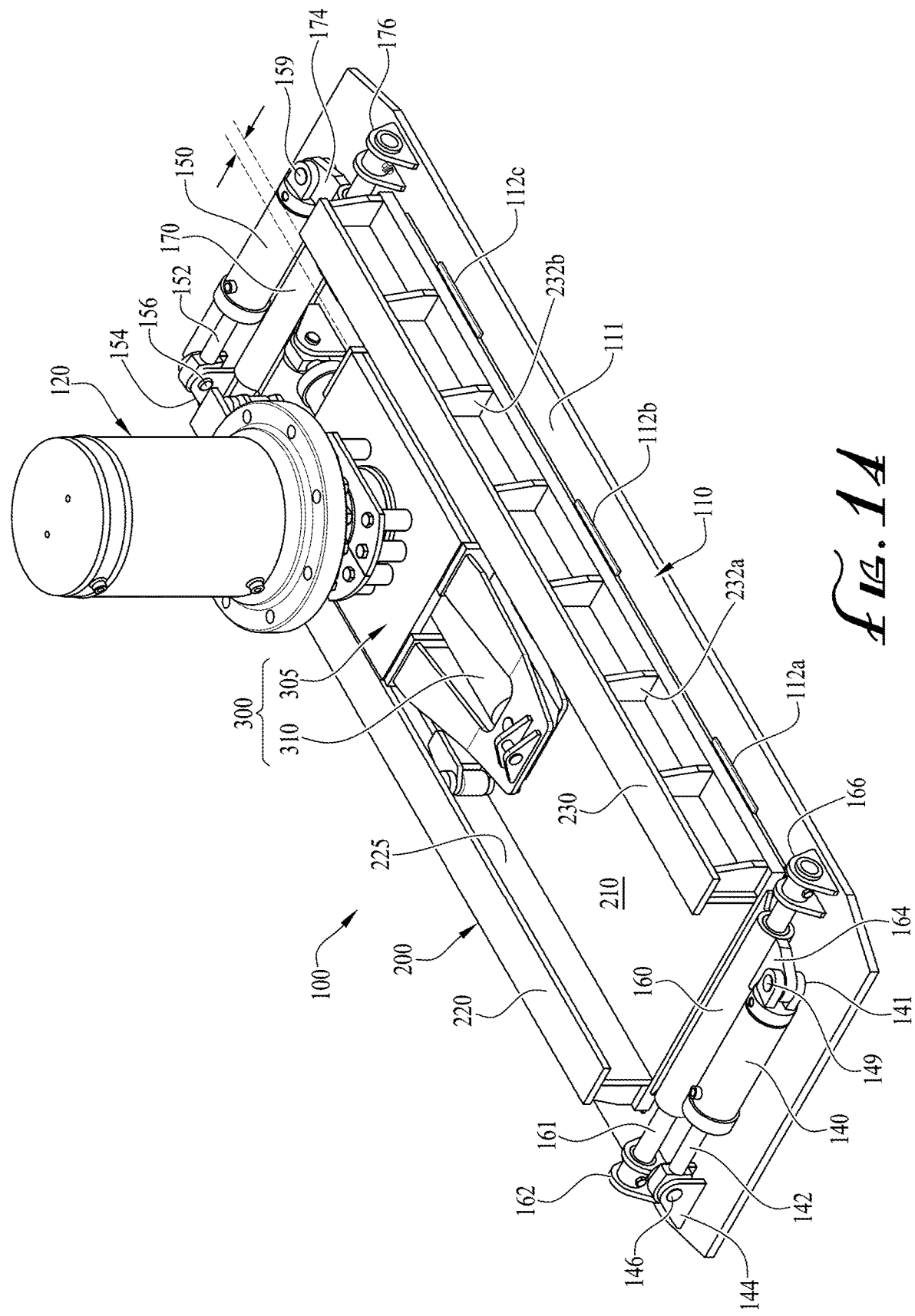
FIGS. 14 and 15 are top right and left rear isometric views of a walking machine unit according to one embodiment.
Figure 15:
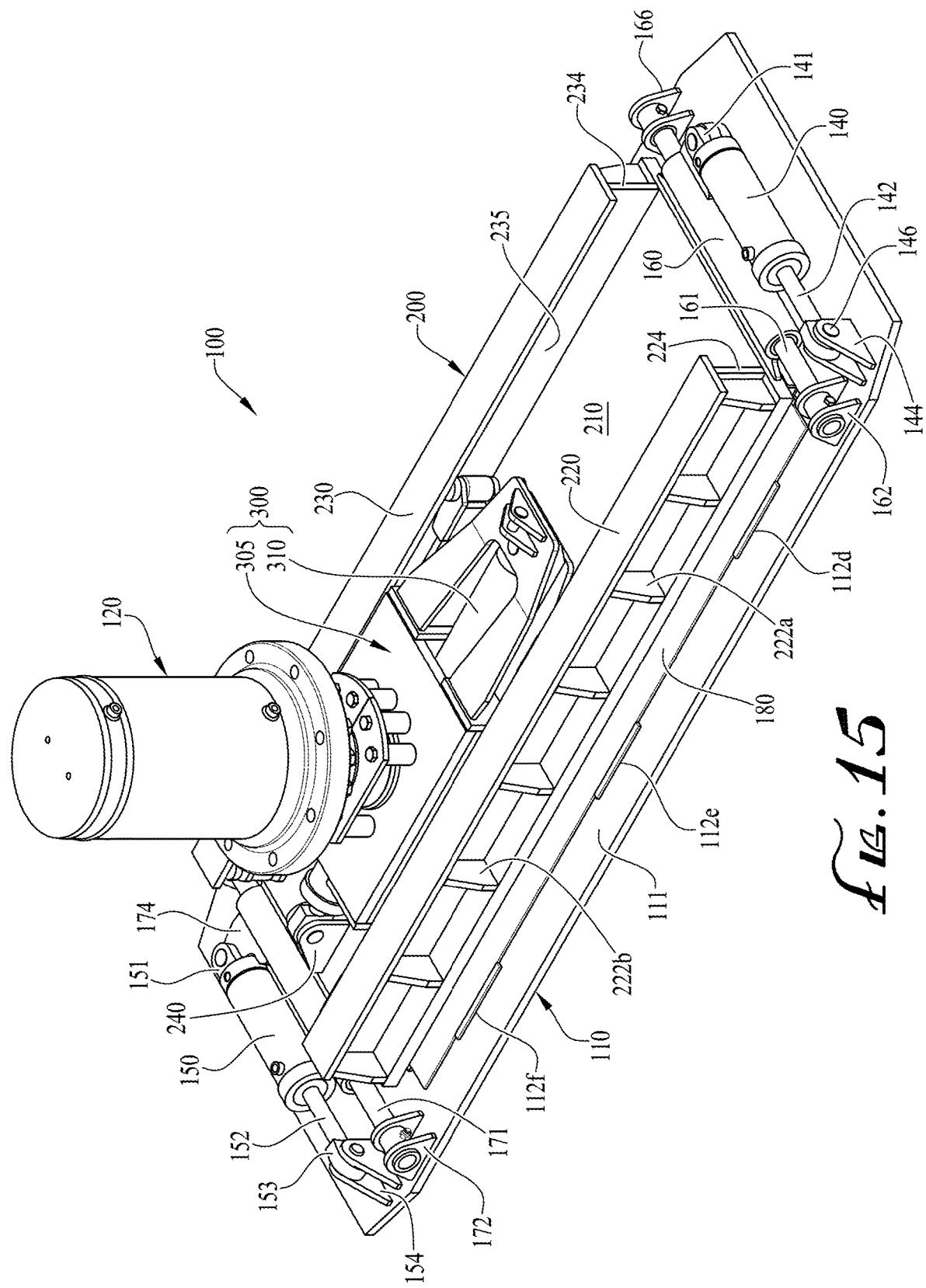

FIGS. 14-16 collectively illustrate details of the walking machine unit 100 according to an embodiment. As noted previously, it should be understood that any description relating to walking machine unit 100 also applies to walking machine units 102, 104, 106, or any other walking machine units used in the walking machine system. With general reference to FIGS. 14-16, the walking machine unit 100 comprises a foot plate assembly or foot section 110, an upper roller guide assembly 200 (with lateral drive), a longitudinal drive assembly 300, and a lift assembly 400. With particular reference to FIG. 14, the following provides additional details of the structure and drive system for the lateral translation mechanism according to one embodiment.

With reference to FIG. 14, the foot section 110 comprises a foot plate 111 that contacts the ground surface during a walking motion of the walking machine unit 100. The foot section 110 comprises a foot plate 111 of generally rectangular shape that may include slightly curved front and rear ends. In other embodiments, the foot plate 111 may alternatively be another suitable shape such as oblong or circular, the elongated rectangular structure may enable the walking machine unit 100 to have a longer longitudinal travel stroke with a solid/stable footprint. The foot section 110 includes a plurality of retainer bars secured to and arranged about the upper surface of the foot plate 111, including retainer bars 112a, 112b, 112c on one lateral side (see FIG. 14), retainer bars 112d, 112e, 112f on the opposite side (see FIG. 15), and additional retainer bars on the front and rear sides (not shown) of the foot plate 111.

A slide plate 180 (see FIG. 16), which may be constructed of stainless steel, is disposed flat on a substantially central portion of the foot plate 111 nesting between the retainer bars 112. The slide plate 180 thus remains free-floating, but its lateral and longitudinal position is maintained centrally within and flat against the foot plate 111. Alternatively the slide plate 180 may be attached to the foot plate 111 such as by welding or connectors (e.g., screws or bolts), but the floating construction may better manage expansion/contraction issues due to different expansion coefficients of the steel types and may also provide for easier construction and/or repair/replacement or allow for expansion of a non-composite plate configuration due to deflection of the foot plate/slide.

A low friction plate 190 comprising a flat bushing is disposed underneath the lower surface of the roller guide assembly 200 to provide for a low friction slide surface between the roller guide assembly 200 and the slide plate 180. The low friction plate 190 may be made of nylon (e.g., a lubricant filled plastic such as Nylatron® plastic available from Quadrant EPP USA, Inc. of Reading, Pennsylvania), PTFE, bronze or other metal, or other suitable plate/sheet material or coated plate. In other embodiments, a lubrication (e.g., grease) may be applied to the slide plate 180. Alternately, the positions of the slide plate 180 and the low friction plate 190 may be reversed. Alternately, instead of a low friction slide surface configuration, roller bearings or other suitable bearing or roller assembly system may be employed to provide for low friction lateral movement.

With collective reference to FIGS. 14-16, the roller guide assembly 200 comprises a main or bottom plate 210 and first and second roller support sides. The first roller support side comprises a top plate 230 and a vertical wall 234 forming a generally I-beam cross-section with the bottom plate 210. The top plate 230, vertical wall 234 and bottom plate 210 collectively form an open channel or track 235. The top plate 230 is secured to the vertical wall 234 and the bottom plate 210 via a series of eight stiffening ribs, two of which are designated by element numerals 232a and 232b (see FIG. 14). Similarly, the second roller support side comprises a top plate 220 and a vertical wall 224 forming a generally I-beam cross-section with the bottom plate 210. The top plate 220, vertical wall 224 and bottom plate 210 form an open channel or track 225. The top plate 220 is secured to the vertical wall 224 and the bottom plate 210 via a series of eight stiffening ribs, two of which are designated by element numerals 222a and 222b.

Guide tubes 160, 170 are attached to the bottom plate 210 on opposite longitudinal sides. The guide tube 160 includes an attachment bracket 164, and the guide tube 170 includes an attachment bracket 174. The roller guide assembly 200 is mounted to the foot plate 111 via the guide tubes 160, 170 to allow lateral movement. Guide bars 161, 171 are disposed on opposite longitudinal sides of the foot plate 111. Guide bar 161 is secured to the foot plate 111 via brackets 162, 166, and guide bar 171 is secured to the foot plate 111 by brackets 172, 176. Brackets 144, 154 are also secured onto the foot plate 111 for attachment to the lateral drive cylinders 140, 150. A cylindrical sleeve or bushing 160a of low friction material (e.g., nylon or other suitable material) may be installed within the guide tube 160 and around the guide bar 161, and a cylindrical sleeve or bushing 170a of low friction material is similarly installed within the guide tube 170 and around the guide bar 171.

The lateral drive force is provided by lateral drive cylinders 140, 150 attached between the roller guide assembly 200 and the foot plate 111. The drive cylinder 140 is connected at one end 141 to the bracket 164 via a pin 149, and at its second end 145 on piston shaft 142 to the bracket 144 on foot plate 111 via pin 146. Similarly on the other side, the drive cylinder 150 is connected at one end 151 to the bracket 174 via a pin 159, and at its second end 155 on piston shaft 152 to the bracket 154 on foot plate 111 via pin 156. Alternate lateral drive force may be provided by any suitable drive mechanism including the piston/cylinder drive (as illustrated), jack screw drive, rack and pinion assembly, chain and sprocket drive, gear drive, electric motor, or other drive systems.

The entire lift mechanism 400 and roller guide assembly 200 thus are able to be translated laterally, driven by the hydraulic drive cylinders 140, 150, via the interaction of slide plates 180 and friction plate 190 described previously with reference to FIG. 16. Further details relating to the lift assembly 400 and roller guide assembly 200 for accommodating lateral translation movement are described in U.S. Pat. App. No. 2017/00227695, the disclosure of which is incorporated by reference herein.

Figure 17:
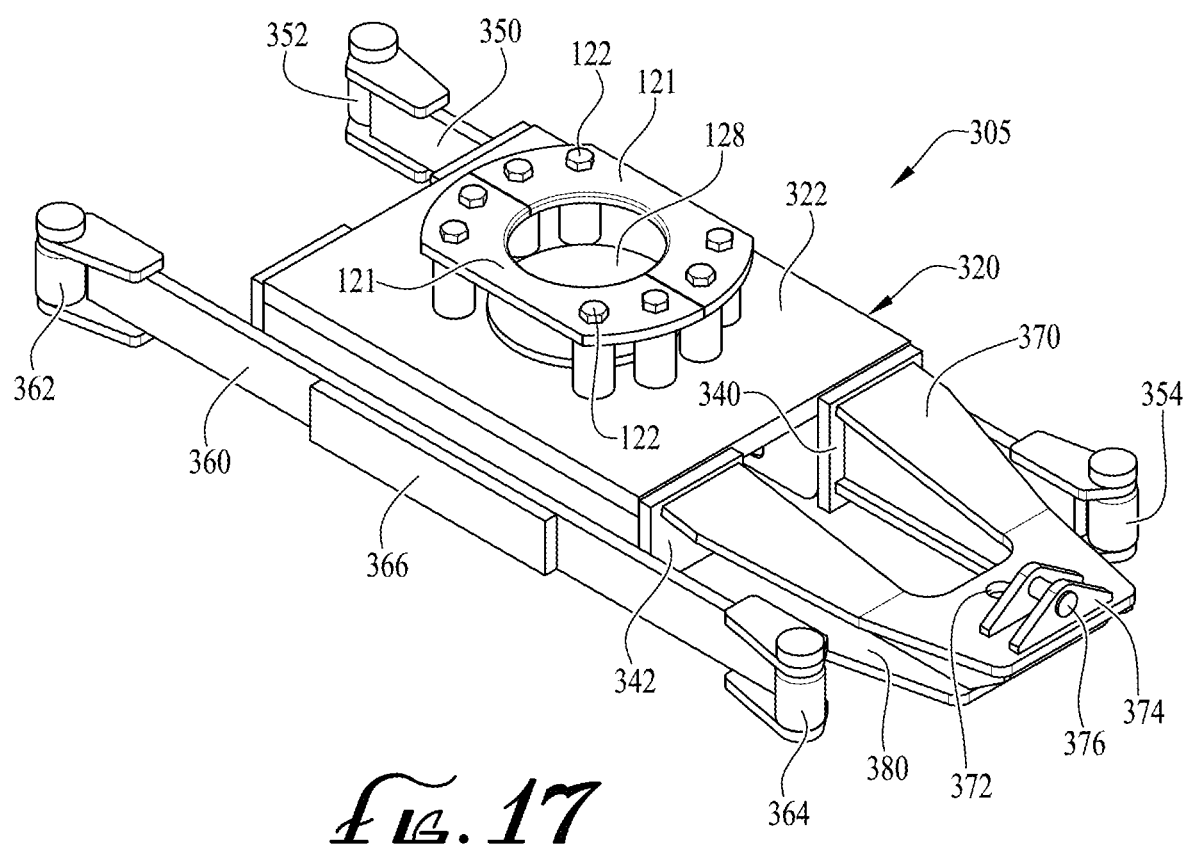
FIG. 17 is a top isometric view of a roller assembly of the walking machine unit of FIG. 14.
Figure 18:
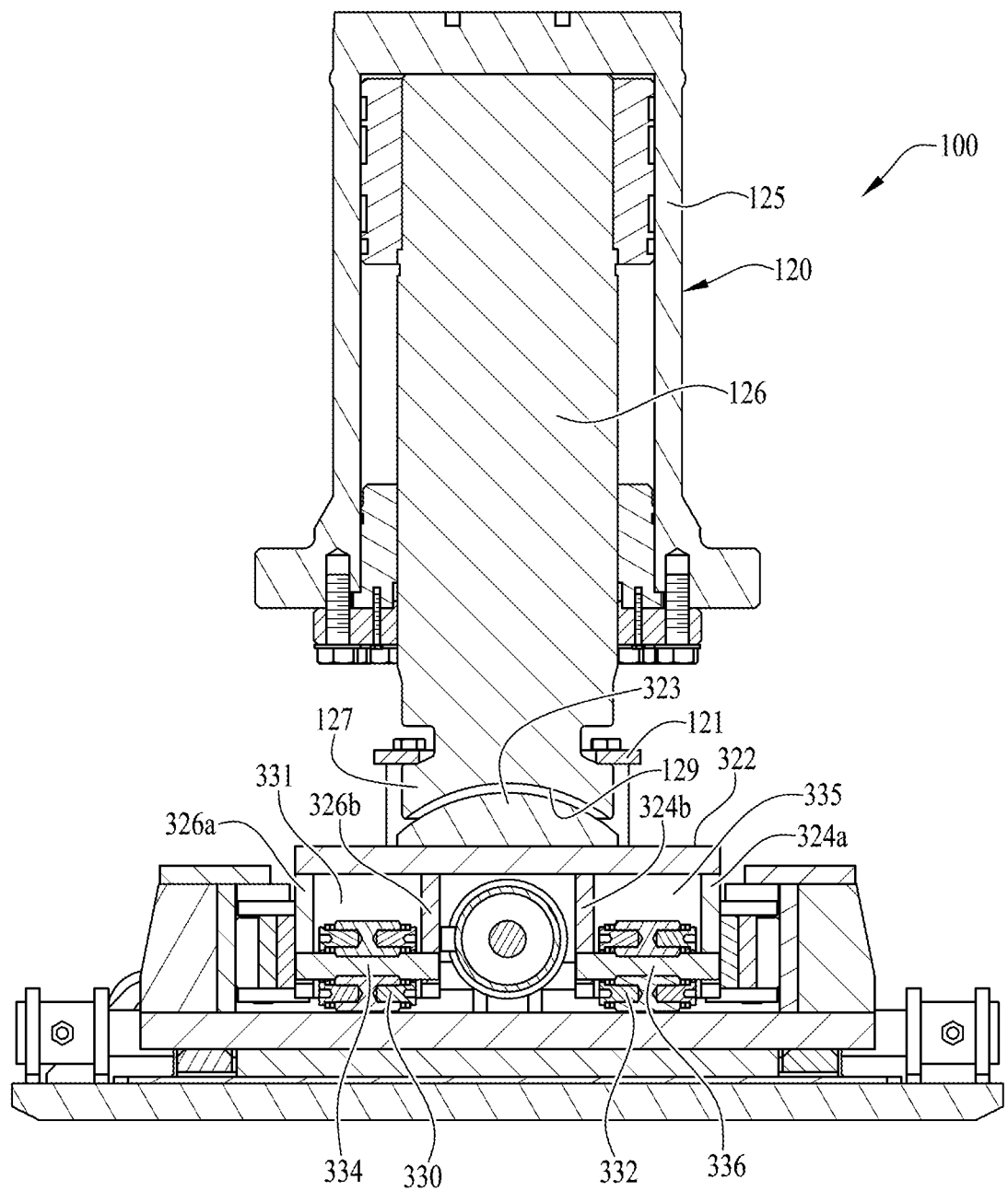
FIG. 18 is a cross-section view illustrating internal components of the roller assembly.

With collective reference to FIGS. 16-18, the following sections describe details relating to the longitudinal drive assembly 300 for accommodating longitudinal movement of the walking machine. As illustrated in the figures, the longitudinal drive assembly 300 comprises a roller assembly 305 and drive cylinder 310. With particular reference to the cross-section of FIG. 18, the roller assembly 305 includes a roller housing section 322 of generally rectangular box shape formed with two internal channels 331, 335 for accommodating the rollers 334, 336. The first internal channel 331 is formed by side walls 326a, 326b, with roller plate 334 attached to the side walls 326a, 326b. The second internal channel 335 is formed by side walls 324a, 324b, with roller plate 336 attached to the side walls 324a, 324b. The rollers 334, 336 may comprise chain roller bearings such as available from Hilman Incorporated of Marlboro, New Jersey. Other low friction or reduced friction systems may be employed for the longitudinal drive assembly 300 in place of the roller assembly 305, such as other types of bearings, slide surfaces (e.g., a plate bushing), or other suitable construction.

With particular reference to FIG. 17, the roller assembly 305 includes a drive connection bracket assembly including a U-shaped upper bracket 370 and a U-shaped lower bracket 380. An attachment bracket 374 is disposed on the end of the upper bracket 370. A hole 372 is disposed in the end of the upper bracket 370 for connection to the longitudinal drive cylinder 310. The longitudinal drive cylinder 310 is disposed within a central channel or opening between the (inner) side walls 326b, 324b and extends into the open inner portion of the U-shaped brackets 370, 380. As illustrated in FIGS. 15 and 16, the longitudinal drive cylinder 310 is connected at its shaft end 312 to bracket 240 on the upper roller guide assembly 200 via a pin 313, and on the other end 314 to upper and lower brackets 370, 380 via a pin 315 extending through a hole (not shown) formed in the upper bracket 370 and a corresponding hole (not shown) in the lower bracket 380.

It should be understood that although the longitudinal drive mechanism is shown for example as a hydraulic drive system comprising the longitudinal drive cylinder 310, other types of longitudinal drive mechanisms may be employed such as the piston/cylinder drive (as illustrated), jack screw drive, rack and pinion assembly, chain and sprocket drive, gear drive, electric motor, or other drive systems.

Figure 19B:
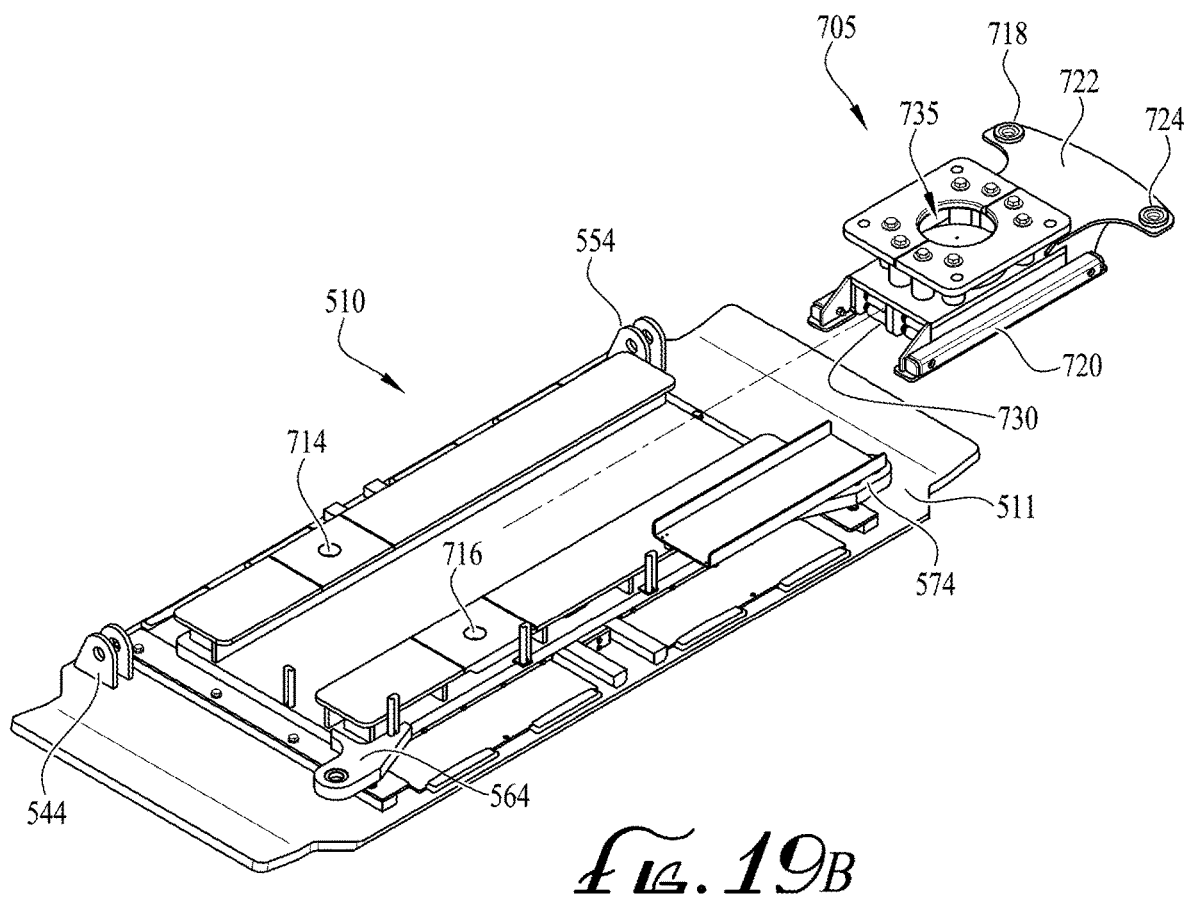
Figure 19C:
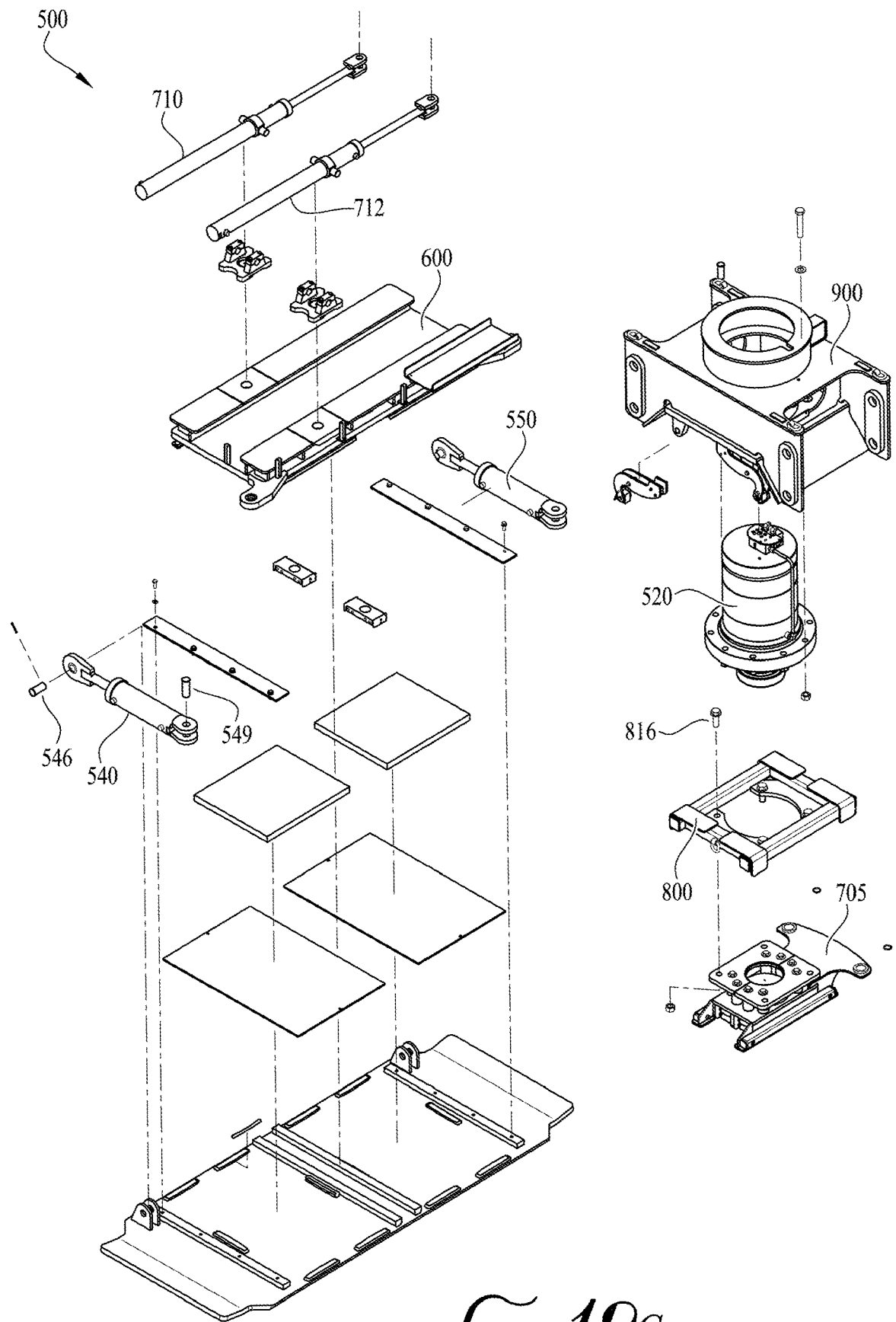

FIGS. 19A, 19B, and 19C collectively illustrate another embodiment of a walking machine unit 500 (see FIG. 19C) that can be used in conjunction with the walking machine system. The walking machine unit 500 may include some of the same features and characteristics as the walking machine unit 100 described previously with reference to FIGS. 14-18. Accordingly, certain features of the walking machine unit 500 may be described briefly herein and other features may not be further discussed in detail to avoid obscuring more pertinent features of the embodiment. The following section provides a brief description of the walking machine unit 500 for ease of reference followed by a more detailed description of particular features of the walking machine unit 500.

Briefly, the walking machine unit 500 includes a foot section 510 with a foot plate 511 that contacts the ground surface during a walking motion of the walking machine unit 500. Similar to foot plate 111, the foot plate 511 may have a generally rectangular shape with curved ends, or may have any other suitable shape to support movement of the walking machine unit 500. The foot section 510 includes a plurality of retainer bars secured to and arranged about the upper surface of the foot plate 511, including retainer bars 512a, 512b, 512c, 512d on one lateral side, retainer bars 512e, 512f, 512g, 512h on the opposite side, and additional retainer bars 512i, 512j on a front foot plate section 511a, and retainer bars 512k (second retainer obscured from view) on a rear foot plate section 511b.

Slide plates 580a, 580b, which may be constructed of stainless steel, are disposed flat on the foot plate 511, with one slide plate 580a positioned against the front foot plate section 511a, and the other slide plate 580b positioned against the rear foot plate section 511b, where the slide plates 580a, 580b nest between the respective retainer bars 512a-512k on the foot plate 511. The slide plates 580a, 580b thus remain free-floating, but their respective lateral and longitudinal position is maintained centrally within and flat against the foot plate 511. Alternatively the slide plates 580a, 580b may be fixedly attached to the foot plate 511 such as by welding or connectors (e.g., screws or bolts), but the floating construction may better manage expansion/contraction issues due to different expansion coefficients of the steel types and may also provide for easier construction and/or repair/replacement or allow for expansion of a non-composite plate configuration due to deflection of the foot plate/slide.

The walking unit 500 includes a set of low friction plates 590a, 590b each comprising a flat bushing, where the plates 590a, 590b are disposed underneath the lower surface of the roller guide assembly 600 to provide for a low friction slide surface between the roller guide assembly 600 and the slide plates 580a, 580b. As described previously, the low friction plates 590a, 590b may be made of nylon (e.g., a lubricant filled plastic such as Nylatron® plastic available from Quadrant EPP USA, Inc. of Reading, Pennsylvania), PTFE, bronze or other metal, or other suitable plate/sheet material or coated plate. In other embodiments, a lubrication (e.g., grease) may be applied to the slide plates 580a, 580b. Alternately, the positions of the slide plates 580a, 580b and the low friction plates 590a, 590b may be reversed. Alternately, instead of a low friction slide surface configuration, roller bearings or other suitable bearing or roller assembly system may be employed to provide for low friction lateral movement.

The roller guide assembly 600 is similar to the roller guide assembly 200 discussed previously with reference to FIGS. 14-16. Briefly, the roller guide assembly 600 comprises a main or bottom plate 610, a first roller support side 620, and a second roller support side 630. The roller support sides 620, 630 each include vertical walls (not numbered) forming a generally I-beam cross-section with the bottom plate 610. Similar to the roller guide assembly 200, the roller guide assembly 600 includes a plurality of stiffening ribs (not numbered) extending from the bottom plate 610 to strengthen the roller support sides 620, 630.

Similar to the walking machine unit 100, the lateral drive force for the walking machine unit 500 is provided by lateral drive cylinders 540, 550 (see FIG. 19C) attached between the roller guide assembly 600 and the foot plate 511. The drive cylinder 540 is connected at one end to the bracket 564 via a pin 549, and at its second end to the bracket 544 on foot plate 511 via pin 546 (see FIG. 19B). The drive cylinder 550 is connected in a similar arrangement to the brackets 554, 574 along the other end of the foot plate 511. Alternate lateral drive force may be provided by any suitable drive mechanism including the piston/cylinder drive (as illustrated), jack screw drive, rack and pinion assembly, chain and sprocket drive, gear drive, electric motor, or other drive systems.

The following sections describe details relating to the longitudinal drive assembly for accommodating longitudinal movement of the walking machine. With particular reference to FIG. 19C, the longitudinal drive assembly comprises a roller assembly 705 and a pair of drive cylinders 710, 712. The roller assembly 705 includes a roller housing section 720 of generally rectangular box shape formed with two internal channels (not shown) for accommodating a set of rollers 730 (see FIG. 19B). The rollers 730 may comprise chain roller bearings or other low friction or reduced friction systems such as bearings, slides surfaces, or other suitable construction operable to facilitate movement of the roller assembly 705. In a similar fashion as the roller assembly 305, the roller assembly 705 is positioned on the roller guide assembly 600 between the roller support sides 620, 630 to accommodate longitudinal movement.

The drive cylinders 710, 712 are attached to the roller support sides 620, 630 of the roller guide assembly 600 and also attached to the roller assembly 705 to drive the walking machine unit 500 in a longitudinal direction. With reference to FIG. 19A, the drive cylinder 710 is attached along one end to the roller support sides 630 via opening 714 formed thereon, and the drive cylinder 712 is attached along one end to the roller support sides 620 via opening 716 formed thereon. The drive cylinder 710 is also attached along another end to an opening 718 formed on a flange 722 of the roller housing section 720, and the drive cylinder 712 is also attached along another end to an opening 724 formed on the flange 722 of the roller housing section 720. It should be understood that although the longitudinal drive mechanism is shown for example as a hydraulic drive system comprising the longitudinal drive cylinders 710, 712, other types of longitudinal drive mechanisms may be employed such as the piston/cylinder drive (as illustrated), jack screw drive, rack and pinion assembly, chain and sprocket drive, gear drive, electric motor, or other drive systems.

With particular reference to FIGS. 20-24, the following sections collectively describe components of the walking machine unit 500 designed to center or accommodate for misalignment during the drive operation when moving a load using the walking machine system. FIGS. 20A, 20B, and 20C collectively illustrate an embodiment of a centering fixture (or frame) 800 of the walking unit 500. With reference to FIGS. 20A, 20B, and 20C, the centering fixture 800 includes a first support arm 802 and an opposite second support arm 804. The fixture 800 further includes a second pair of support arms 806, 808 each extending transversely across from the first support arm 802 to the second support arm 804 along top and bottom ends to form a generally square-shaped or rectangular-shaped structure for the centering fixture 800. It should be understood that in other embodiments, the fixture 800 may have a profile other than a square or rectangular shape.

The fixture 800 includes a first mounting plate 810 positioned between the first and second support arms 802, 804 and adjacent the arm 806, where the first mounting plate 810 is coupled to the arms 802, 804, 806. Similarly, the fixture 800 includes a second mounting plate 812 is positioned between the first and second arms 802, 804 and adjacent the arm 808 and coupled thereto. The mounting plates 810, 812 each include one or more fastener openings 814 (e.g., bolt holes) for receiving bolts 816 (see FIG. 19C) therethrough to attach the centering fixture 800 to the roller assembly 705 when the walking machine unit 500 is assembled. With reference to FIG. 20B, the centering fixture 800 includes an opening 818 disposed between the mounting plates 810, 812 and bounded between the support arms 802, 804. The opening 818 aligns with an opening 735 formed on the roller assembly 705 (see FIG. 19B) to accommodate the lift cylinder 520 when the walking machine unit 500 is fully assembled.

With reference to FIG. 20A, the centering fixture 800 further includes one or more centering members or strike plates 820 supported thereon, the strike plates 820 each providing a contact area for an alignment or centering pivot arm 828 of the walking machine unit 500 as further described in detail below with reference to FIGS. 21-24. Turning back to FIG. 20A, the strike plate 820 is generally an L-shaped bracket having a first surface 822 and a second surface 824 arranged generally orthogonally to the first surface 822. In some embodiments, the centering fixture 800 may include four strike plates 820, with one strike plate 820 coupled to the arms 802, 806; one strike plate 820 coupled to the arms 804, 806; one strike plate 820 coupled to the arms 802, 808; and one strike plate 820 coupled to the arms 804, 808, as illustrated in FIG. 20B. In such embodiments, the first surface 822 of the strike plate 820 is arranged along a horizontal plane of the centering fixture 800 and the second surface 824 arranged along a vertical plane of the centering fixture 800, such that the strike plates 820 each generally wrap around either the first and second support arms 802, 804. In other embodiments, the centering fixture 800 may include only two strike plates, such as where the two strike plates 820 supported on arm 806 are formed as a single, integral unit, and the two strike plates 820 supported on arm 808 are formed as a single, integral unit.

In some embodiments, the centering fixture 800 may be made of a welded steel construction. Due to its weight, the centering fixture 800 may be difficult to lift manually during the assembly process. Accordingly, in some embodiments, the centering fixture 800 may include a lift ring 826 (e.g., a D-ring assembly) coupled to one or both arms 806, 808 to aid in lifting the centering fixture 800.

Figure 21A:
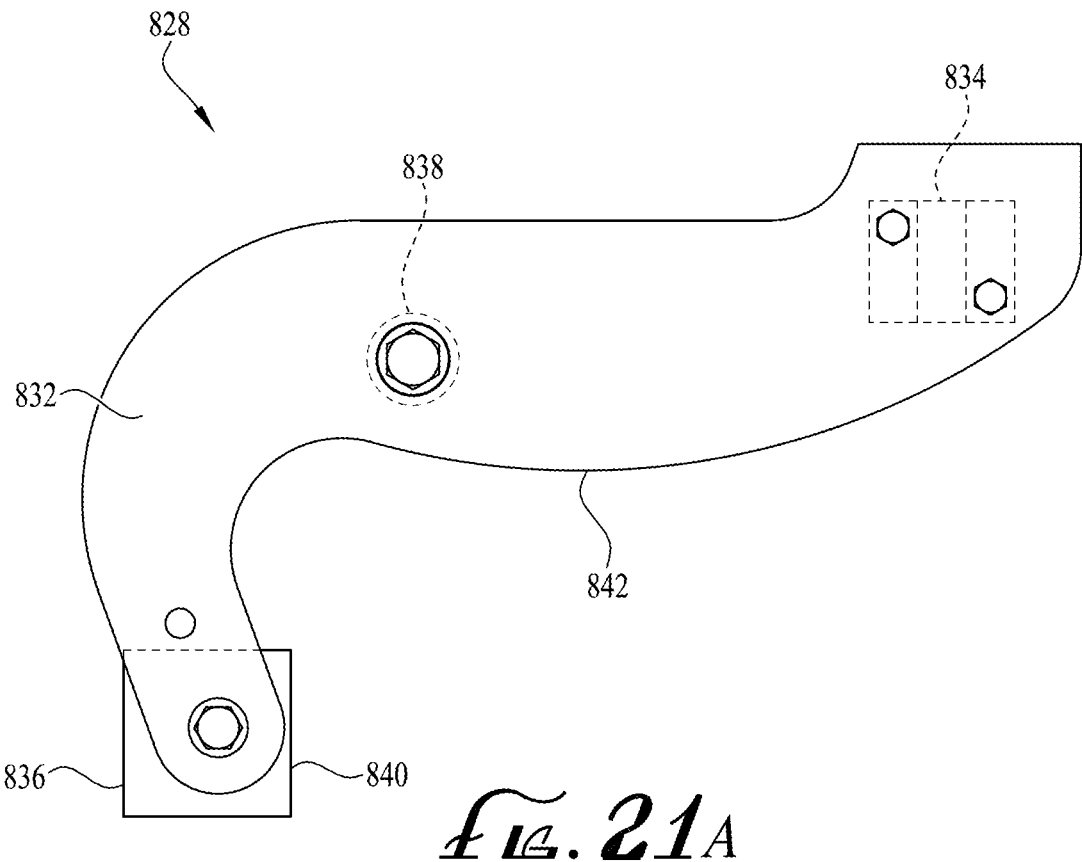
Figure 21B:
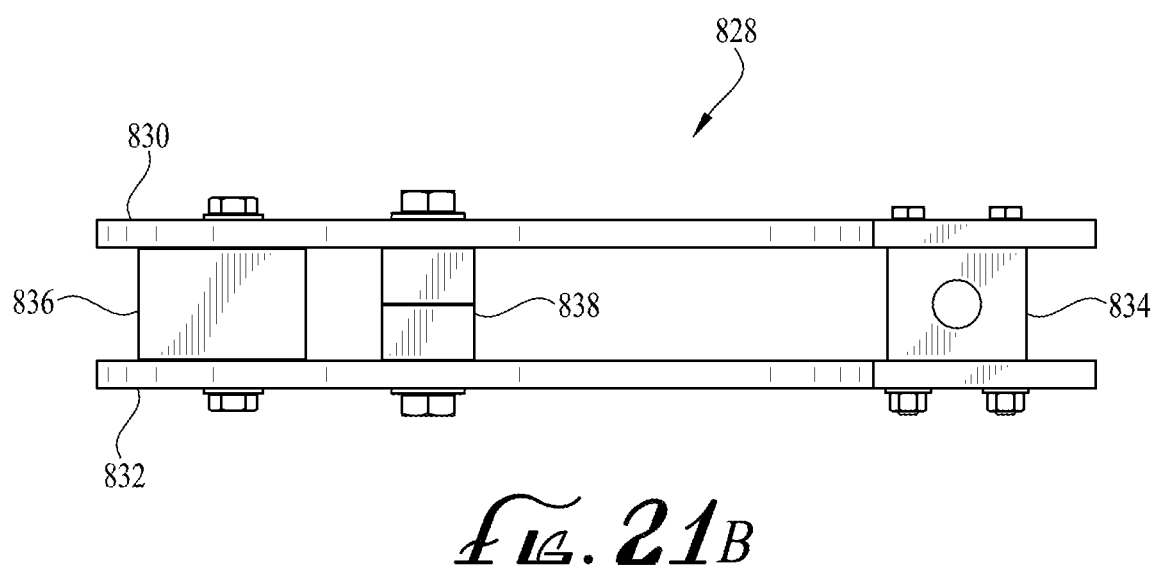

FIGS. 21A and 21B are a side elevation and top plan view, respectively, of a centering pivot arm 828 of the walking machine unit 500, and FIG. 22 is an exploded view of the centering pivot arm 828. With collective reference to these figures, the centering pivot arm 828 includes a first pivot arm side plate 830 and a second pivot arm side plate 832, each having a generally S-shaped curve construction. The centering pivot arm 828 includes a jacking block 834 coupled along one end between the pivot arm side plates 830, 832, and further includes an adjustable bearing block 836 coupled along an opposite end between the side plates 830, 832. In addition, a stainless steel pin 838 extends between the side plates 830, 832 and provides an attachment point of the centering pivot arm 828 to the hood assembly 900 (see FIG. 23).

With particular reference to FIGS. 21A and 21B, the adjustable bearing block 836 includes at least one contact surface 840. Preferably, the contact surface 840 is generally flat/planar to reduce bearing pressure in comparison to a round contact surface, but the surface can have any suitable profile. Briefly, the adjustable bearing block 836 corrects for rotational misalignment of the foot, while the foot level contact surface 842 helps ensure the foot is level and parallel to the ground. Additional information on the functionality of the centering pivot arms 828, adjustable bearing block 836, and foot leveling contact surface 842 is described in further detail with particular reference to FIGS. 23-25. In some embodiments, the adjustable bearing block 836 may be made of an ultra-high molecular weight plastic or nylon material to provide some sliding contact and minimize wear. In other embodiments, the adjustable bearing block 836 may instead be a steel block (or other suitable metal), or may be formed from a metal structure and include a plastic contact surface.

With reference to FIGS. 23 and 24, the following section provides a high-level description of the functionality of the centering pivot arms 828. Although reference in the following description is made only to one centering pivot arm 828, it should be understood that the walking machine unit 500 typically includes four pivot arms 828 (two on each of a front side and a rear side of the machine walking unit 500) each operating in the same general fashion. Accordingly, it should be understood that the ensuing description applies equally to all such pivot arms.

With collective reference to FIGS. 23 and 24, the pivot arms 828 are used to re-align the foot section 510 relative to the hood assembly 900 between movements of the load to maintain proper weight distribution of the load being moved. As illustrated in FIG. 23, to properly align the foot section 510, the foot leveling contact surface 842 of the centering pivot arm 828 rests against the first surface 822 of the strike plate 820 (supported on the centering fixture 800) to ensure that the foot section 510 is parallel to the ground when the foot section 510 is raised. In addition, the adjustable bearing block 836 on the end of the centering pivot arm 828 rests against the second surface 824 of the strike plate 820 to correct any rotational misalignment of the foot section 510.

For example, with particular reference to FIG. 24A, when the foot section 510 is rotated in a counter-clockwise direction relative to a central axis A extending through the centering fixture 800, the adjustable bearing block 836a of a first centering pivot arm 828a and the adjustable bearing block 836b of a second centering pivot arm 828b each contact the corresponding strike plates 820a, 820b (along the second surfaces 824) to force a clockwise rotation of the foot section 510 to correct the misalignment. Similarly, with particular reference to FIG. 24B, when the foot section 510 is rotated in a clockwise direction relative to a central axis A extending through the centering fixture 800, the adjustable bearing block 836c of a third centering pivot arm 828c and the adjustable bearing block 836d of a fourth centering pivot arm 828d each contact the corresponding strike plate 820c, 820d (also along the second surfaces 824) to force a counter-clockwise rotation of the foot section 510 to correct the misalignment.

FIGS. 25A, 25B, 25C, 25D, 25E, 25F, and 25G collectively illustrate an embodiment of the walking machine unit 500 during a series of movements. With reference to these figures, the following provides a brief step-by-step illustration of the functionality of the centering pivot arms 828 in conjunction with the centering fixture 800 for realigning the foot section 510 during a movement phase of the walking machine unit 500.

Figure 25B:
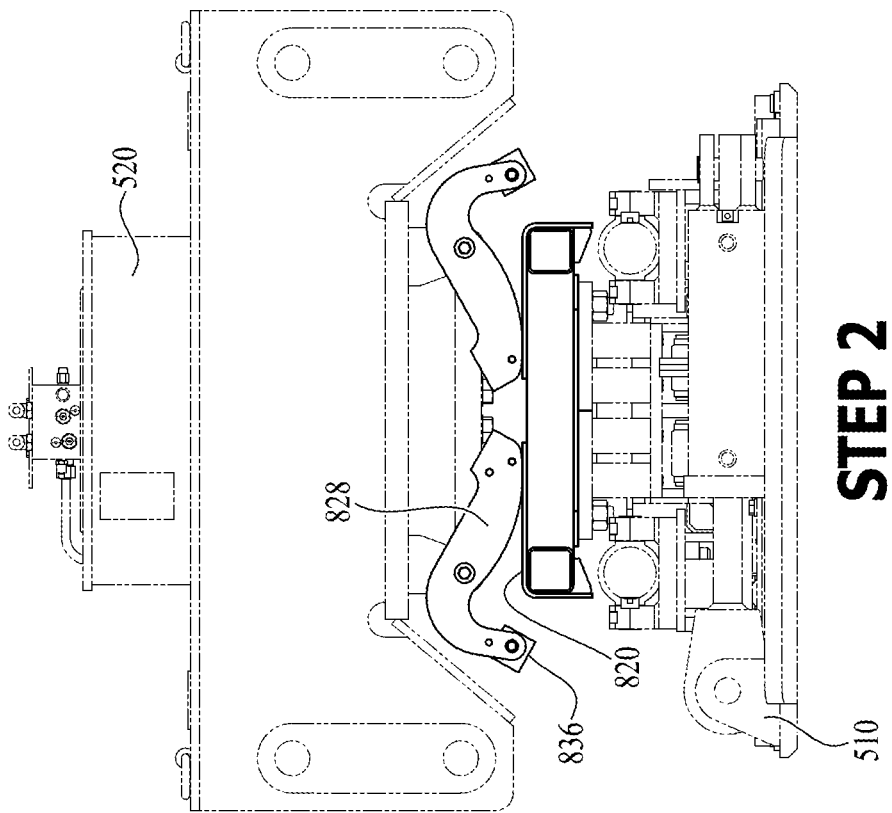
Figure 25A:
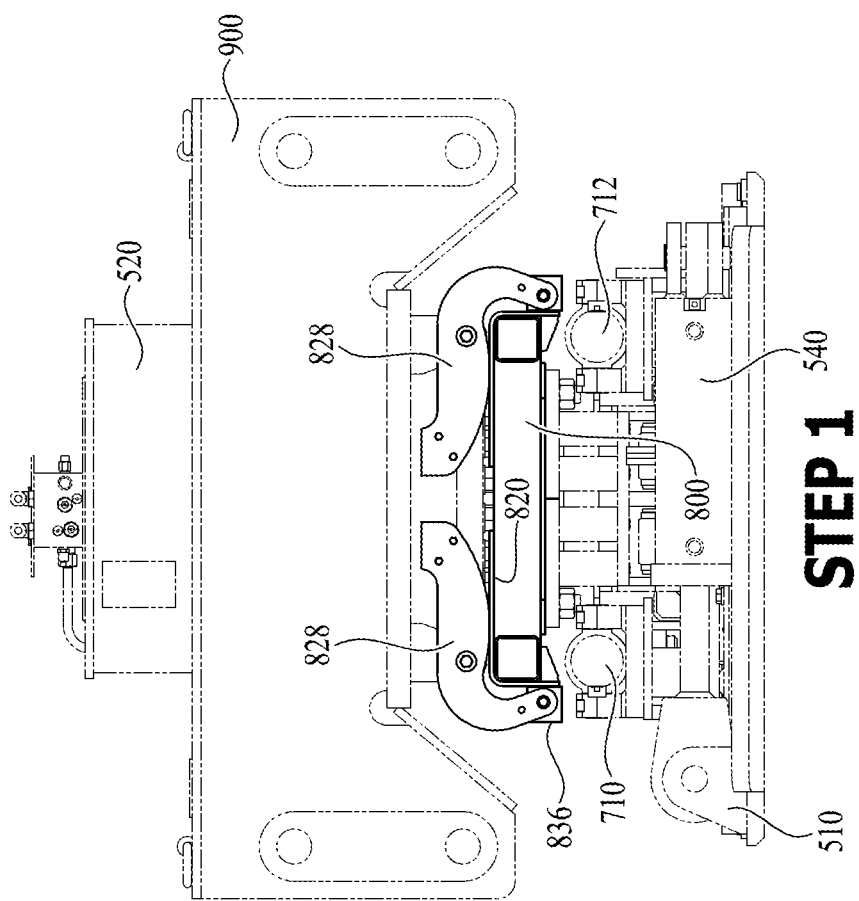

With reference to FIG. 25A, in step 1, the lift cylinder 520 is in a fully retracted position to lift the foot section 510 off the ground. In this position, the centering pivot arms 828 rest against the strike plate 820 on the centering fixture 800 to maintain the foot section 510 properly aligned, with the foot leveling contact surface 842 resting against the first surface 822 of the strike plate 820, and the adjustable bearing block 836 rests against the second surface 824 of the strike plate 820 (see FIGS. 20-21).

With reference to FIG. 25B, in step 2, the lift cylinder 520 is extended from its initial position in step 1 (in this embodiment, the lift cylinder extends approximately three inches). In this configuration, the adjustable bearing block 836 is no longer in contact with the strike plate 820, as the lift cylinder 520 moves and causes the centering pivot arms 828 to pivot away from the edges of the centering fixture 800. The foot leveling contact surface 842 (see FIG. 21A) of the centering pivot arms 828 remains in contact with the strike plate 820 due to articulation of the centering pivoting arms 828. In some embodiments, the pivoting movement of the centering pivot arms 828 may be due to gravitational forces, or may be urged by a spring, actuator or air cylinder, a linkage, or other suitable methods. In step 2, rotation of the foot section 510 may begin (or be completed) if the walking machine unit 500 is being used to rotate the load being carried. In a given walking cycle, the walking machine unit 500 may be able to rotate the foot section 510 (and the load being carried) by about 5° from its initial position.

With reference to FIG. 25C, in step 3, the lift cylinder 520 is extended another three inches for a total of six inches of extension. In this configuration, the adjustable bearing block 836 remains out of contact with the strike plate 820 and a smaller surface of the centering pivot arms 828 (as compared to step 2) remains contacting the strike plate 820. As the lift cylinder 520 is extended, the load carried by the walking machine unit 500 begins to be lifted off the ground.

With reference to FIG. 25D, in step 4, the lift cylinder 520 is extended another three inches for a total of nine inches of extension. In this configuration, there is no contact between the centering pivot arms 828 and the centering fixture 800, as the foot section 510 fully contacts the ground surface. In some embodiments, the lift cylinder 520 may not need to be fully extended to nine inches (e.g., six-inch extension as shown in step 3 is sufficient) to lift the load. The nine-inch extension of the lift cylinder 520 may be used to provide additional clearance for the load to accommodate a walking cycle. For example, if one of the legs 55 of the oil rig 10 (see FIG. 1) required additional clearance to avoid rocks or other debris, then the lift cylinder 520 may be extended to nine inches if the six-inch extension was insufficient.

With reference to FIG. 25E, in step 5, the lift cylinder 520 is retracted three inches such that the lift cylinder 520 returns to a six-inch extension. When the lift cylinder 520 retracts, the centering pivot arms 828 again contacts the strike plate 820, where the strike plate 820 assists in articulation of the centering pivot arms 828.

With reference to FIG. 25F, in step 6, the lift cylinder 520 is retracted another three inches such that the lift cylinder 520 returns to a three-inch extension. In this configuration, while the foot section 510 continues being lifted away from the ground, the foot leveling contact surface 842 of the centering pivot arms 828 contacts the strike plate 820 and begins to reduce the capture area to begin the realignment action.

Finally, with reference to FIG. 25G, in step 7, the lift cylinder 520 is fully retracted, thereby pulling the foot section 510 off the ground. In this configuration, the adjustable bearing block 836 contacts the strike plate 820 to realign the foot section 510 against any rotational movement. With the centering pivot arms 828 arranged back to their initial position (as illustrated in step 1), the walking cycle begin again with step 1 and so on until the walking machine system has reached its final destination.

FIGS. 26-30 collectively illustrate another embodiment of a walking machine unit 1000 designed to center and accommodate for load misalignment during the drive operation when moving a load using the walking machine system. The following description of FIGS. 26-30 focuses on aspects of the walking machine unit 1000 relating particularly to managing load alignment. Accordingly, further details regarding other features of the walking machine system (such as longitudinal or lateral drive assemblies) may not be further discussed in detail to avoid obscuring more pertinent features of the embodiment. The following section provides a brief description of the walking machine unit 1000 for ease of reference followed by a more detailed description of particular features of the walking machine unit 1000 designed for load alignment management.

Figure 26:
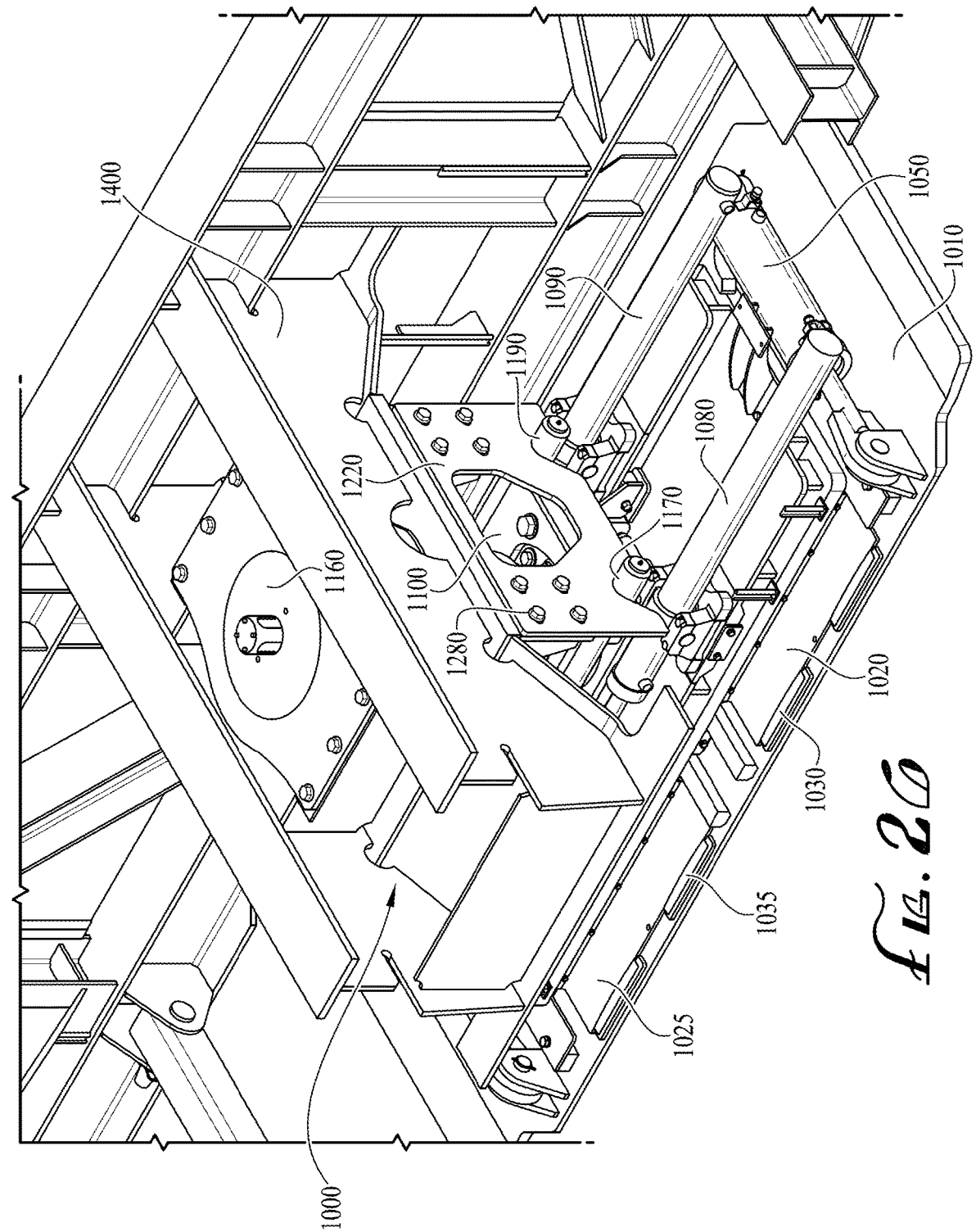
FIG. 26 illustrates a perspective view of a walking machine unit according to another embodiment.
Figure 27:
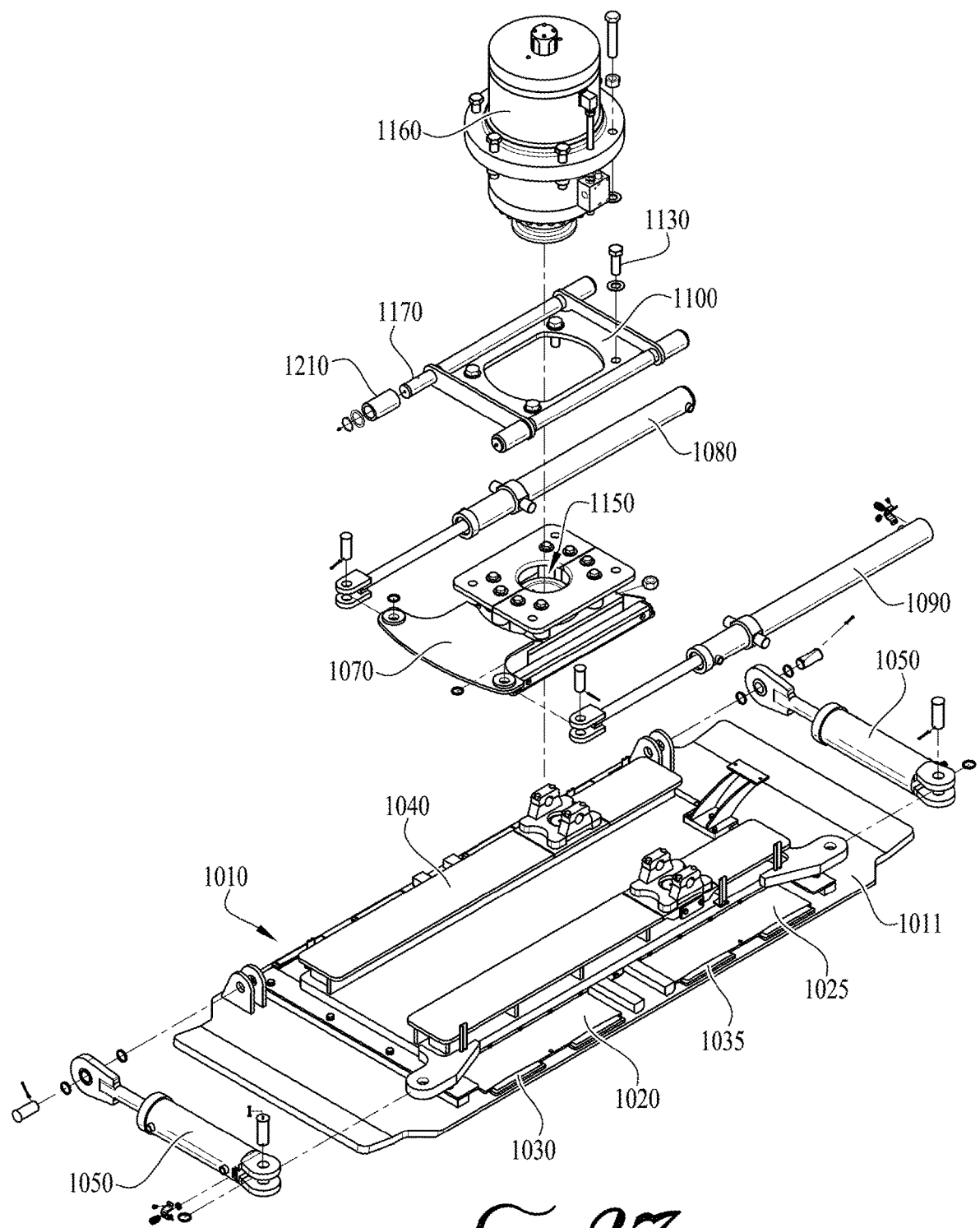
FIG. 27 is a partially exploded view of the walking machine unit of FIG. 26.

FIG. 26 illustrates an example embodiment of the walking machine unit 1000 attached to a rig structure 1400, and FIG. 27 is an exploded view of the walking machine unit 1000. With particular reference to FIG. 27, the following provides a brief description of various components of the walking machine unit 1000. As illustrated in FIG. 27, the walking machine unit 1000 includes a foot section 1010 having a foot plate 1011 that contacts the ground surface during a walking motion of the walking machine unit 1000. Similar to the foot plates 111, 511 described previously, the foot plate 1011 may have a generally rectangular shape with curved ends, or may have any other suitable shape to support movement of the walking machine unit 1000. The foot section 1010 supports one or more slide plates 1020, which may be laid flat against the foot plate 1011 and nested between various retainer bars 1030 of the foot section 1010 to facilitate movement of the walking machine unit 1000 in a similar fashion as described with reference to previous embodiments.

The walking machine unit 1000 further includes a roller guide assembly 1040 for accommodating lateral movement of the walking machine, the roller guide assembly 1040 having similar features as the roller guide assemblies 200, 600 described previously. Similar to the previous embodiments, the lateral drive force for the walking machine unit 1000 is provided by lateral drive cylinders 1050, 1060 attached along front and rear ends of the foot plate 1011. An alternate lateral drive force may be provided by any suitable drive mechanism including the piston/cylinder drive (as illustrated), jack screw drive, rack and pinion assembly, chain and sprocket drive, gear drive, electric motor, or other drive systems.

The walking machine unit 1000 further includes a longitudinal drive assembly having similar features as the longitudinal drive assemblies described previously. Briefly, the assembly includes a roller assembly 1070 and a pair of drive cylinders 1080, 1090 attached to the roller assembly 1070 to drive the walking machine unit 1000 in a longitudinal direction. The roller assembly 1070 may include the same or similar components as described previously with respect to roller assembly 705, including longitudinal drive cylinders 1080, 1090 arranged in a similar fashion as described previously. It should be understood that although the longitudinal drive mechanism is shown for example as a hydraulic drive system comprising the longitudinal drive cylinders 1080, 1090, other types of longitudinal drive mechanisms may be employed such as the piston/cylinder drive (as illustrated), jack screw drive, rack and pinion assembly, chain and sprocket drive, gear drive, electric motor, or other drive systems.

Figure 28:
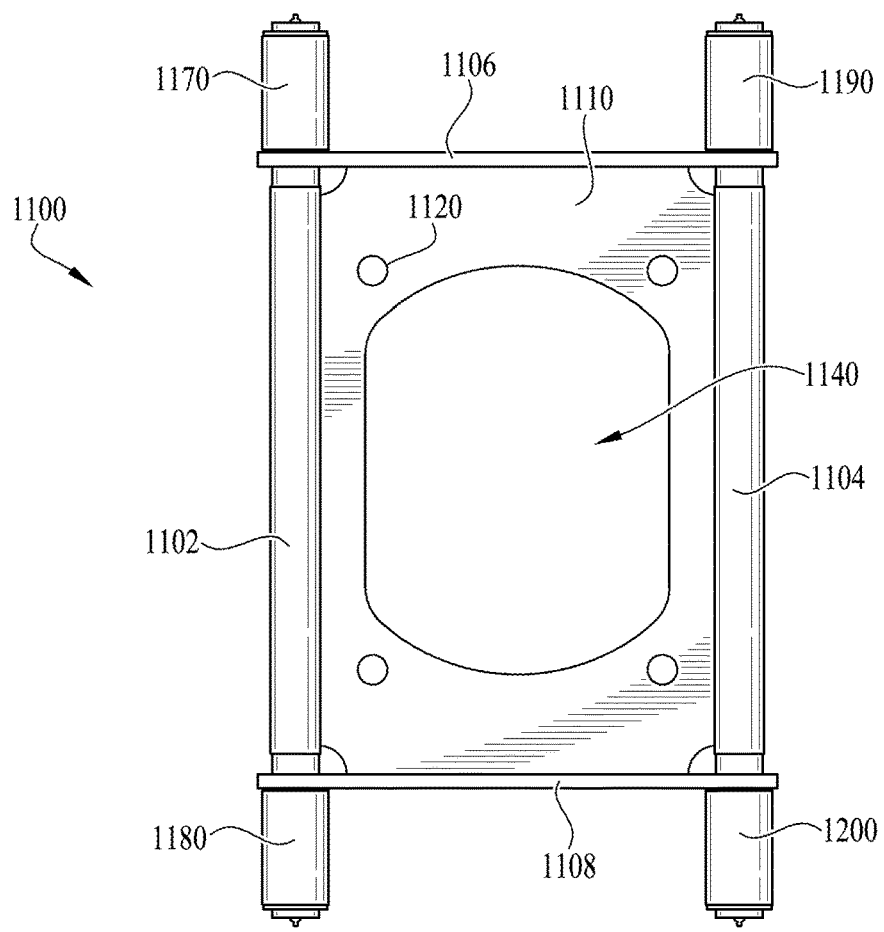
FIG. 28 illustrates an embodiment of a centering fixture or frame of the walking machine unit of FIG. 26.
Figure 29:
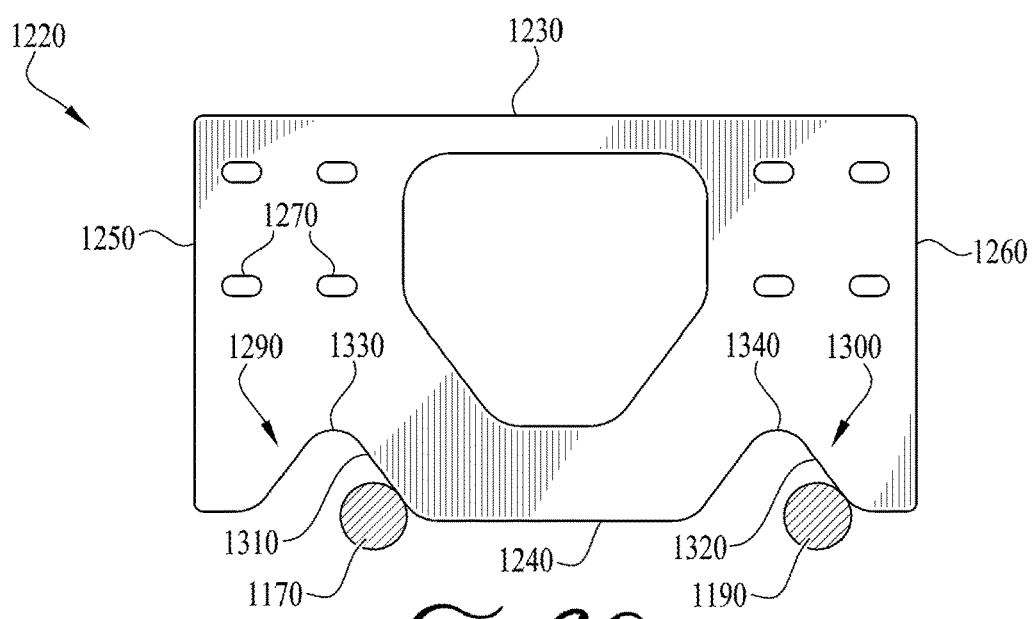
FIG. 29 illustrates an example embodiment of an alignment plate of the walking machine unit of FIG. 26.

With general reference to FIGS. 26-29, the following sections collectively describe components of the walking machine unit 1000 designed to center or accommodate for load misalignment during the drive operation of the walking machine system. FIG. 28 illustrates an embodiment of a centering fixture (or frame) 1100 of the walking unit 1000, and FIG. 29 illustrates an embodiment of an alignment plate 1220 that operates in conjunction with the centering fixture 1100 to ensure the load is properly aligned during movement of the walking machine. With reference to FIG. 28, the centering fixture 1100 includes a first arm 1102 and an opposite second arm 1104 offset from one another, each of which extending along a longitudinal axis. A first plate 1106 is attached along an end of the first arm 1102 and along an end of the second arm 1104, where the plate 1106 extends transversely across the first and second arms 1102, 1104. Similarly, the fixture 1100 includes a second plate 1108 extending across from the first arm 1102 to the second arm 1104, the first and second plates 1106, 1108 being offset from one another and extending along a horizontal axis. In this configuration, the arms 1102, 1104 and plates 1106, 1108 form a generally square-shaped or rectangular-shaped structure for the centering fixture 1100. It should be understood that in other embodiments, the fixture 1100 may have a profile other than a square or rectangular shape.

The fixture 1100 further includes a mounting plate 1110 disposed between the arms 1102, 1104 and the plates 1106, 1108. The mounting plate 1110 includes one or more fastener openings 1120 (e.g., bolt holes) extending therethrough for receiving bolts 1130 (see FIG. 27) to attach the centering fixture 1100 to the roller assembly 1070 when the walking machine unit 1000 is assembled. As illustrated in FIG. 28, the centering fixture 1100 includes an opening 1140 disposed along a central portion of the mounting plate 1110. In an assembled configuration, the opening 1110 aligns with an opening 1150 formed on the roller assembly 1070 (see FIG. 27) to accommodate a lifting cylinder 1160 when the walking machine unit 1000 is fully assembled. As described in previous embodiments, the lifting cylinder 1160 is used to create a lifting force needed to operate the walking machine and transport the load.

Returning to FIG. 28, the fixture 1100 further includes a plurality of alignment posts 1170, 1180, 1190, 1200, each of which extending outwardly relative to the plates 1106, 1108. In one embodiment, the fixture 1100 may include four alignment posts, with a pair of alignment posts 1170, 1180 aligned along a common axis extending through the first arm 1102 such that the alignment post 1170 is positioned adjacent a first end of the first arm 1102 and the alignment post 1180 is positioned adjacent an opposite second end of the first arm 1102. Similarly, the second pair of alignment posts 1190, 1200 are aligned along a common axis extending through the second arm 1104 in a similar arrangement as described previously with respect to the alignment posts 1170, 1180.

The configuration of the alignment posts 1170, 1180, 1190, 1200 described above can be achieved in any one of various suitable designs. For example, in one embodiment, the alignment posts may be formed as integral components of the respective arms 1102, 1104. In one such embodiment, the arms 1102, 1104 may be sufficiently long such that a portion of the arm shaft extends outwardly and beyond the mounting plates 1106, 1108 when coupled, thereby forming the adjustment posts described previously. To accommodate this design, the mounting plates 1106, 1108 may each include openings (not shown) through which the arms 1102, 1104 receive the mounting plates 1106, 1108. Once the mounting plates 1106, 1108 are secured, a portion of the arms 1102, 1104 extends through the openings and protrudes beyond the mounting plates 1106, 1108, thereby forming the alignment posts illustrated in FIG. 28.

In other embodiments, the alignment posts 1170, 1180, 1190, 1200 may instead be separate components apart from the arms 1102, 1104. In such embodiments, the alignment posts may be threaded into or otherwise secured to either the mounting plates 1106, 1108 or the arms 1102, 1104 in various suitable designs. In still other embodiments, the alignment posts 1170, 1180, 1190, 1200 may be formed in different configurations without departing from the principles of the disclosure.

In some embodiments, the alignment posts 1170, 1180, 1190, 1200 may be wrapped with a durable, wear resistant cover 1210 (see FIG. 27) or other suitable protective material to increase the durable life of the alignment posts and to facilitate repair when needed. In other embodiments, the alignment posts may not have a cover and instead be made of durable materials themselves.

FIG. 29 illustrates an example embodiment of an alignment plate 1220 of the walking machine unit 1000 that operates in conjunction with the alignment posts 1170, 1180, 1190, 1200 to ensure proper load alignment. The ensuing section provides details of the alignment plate 1220, followed by a brief description of the functionality of the alignment posts 1170, 1180, 1190, 1200 and the alignment plate 1220 within the walking machine unit 1000.

With reference to FIG. 29, the alignment plate 1220 is a general planar structure having a header end 1230, an opposite footer end 1240, and peripheral sides 1250, 1260. The front and rear surfaces of the alignment plate 1220 include a plurality of openings 1270 extending therethrough, the openings 1270 designed for receiving fasteners 1280 therethrough affix the alignment plate 1220 in position (see FIG. 26). As illustrated in FIG. 29, the footer end 1240 of the alignment plate 1220 includes notches 1290, 1300 formed thereon. The notches 1290, 1300 each include slide surfaces 1310, 1320 that lead toward a seat 1330, 1340 at the uppermost region of the notches 1290, 1300. Preferably, the seat 1330, 1340 has a surface profile designed to correspond with the exterior profile of the adjustment posts 1170, 1180, 1190, 1200. For example, in the illustrated embodiments, the adjustment posts 1170, 1180, 1190, 1200 are circular, and the seats 1330, 1340 are curved with a radius matching that of the circular adjustment posts 1170, 1180, 1190, 1200 to ensure proper engagement. As further described in detail below, the notches 1290, 1300 on the alignment plate 1220 and the alignment posts 1170, 1180, 1190, 1200 on the centering fixture 1100 operate together to center and align the load being transported on the walking machine units 1000.

With collective reference to FIGS. 26 and 29, the following section provides a description of the functionality of the alignment posts 1170, 1180, 1190, 1200 and the centering fixture 1100 within the walking machine unit 1000. Although reference in the following description is made to operation of only one pair of adjustment posts 1170, 1190, it should be understood that the walking machine unit 1000 typically includes multiple such posts (e.g., two on each of a front side and a rear side of the machine walking unit 1000) each operating in the same general fashion. Accordingly, it should be understood that the ensuing description applies equally to all such adjustment posts.

An example operation of a walking machine unit 500 and lifting cylinder 520 was previously discussed with reference to FIGS. 25A, 25B, 25C, 25D, 25E, 25F, and With reference to walking machine unit 1000 of FIGS. 26-29, the lifting cylinder 1160 and walking foot section 1010 operate in a substantially similar fashion. In other words, the lifting cylinder 1160 cycles through various extended positions to lift the foot section 1010 off the ground and move the load. The following description focuses primarily on the interaction of the alignment posts 1170, 1180, 1190, 1200 and the alignment plate 1220.

During the walking operation, the alignment plate 1220 is raised away from the centering fixture 1100 such that the alignment posts 1170, 1190 are not in contact with the notches 1290, 1300. As the walking operation continues, the alignment plate 1220 is brought together toward the centering fixture 1100. When the load is properly aligned, the alignment posts 1170, 1190 of the centering fixture 1100 are seated in the seats 1330, 1340 of the respective notches 1290, 1300 to maintain the foot section 1010 in a proper, level position. FIG. 29 illustrates an occasion when the foot section 1010 is not in proper position. With reference to FIG. 29, the alignment posts 1170, 1190 are positioned against the slide surfaces 1310, 1320, respectively. From this position, the angled slide surfaces 1310, 1320 guide the adjustment posts 1170, 1190 toward the seats 1330, 1340, thereby shifting the foot section 1010 into proper position. In some embodiments, the centering fixture 1100 and alignment plate 1220 may shift the foot section 1010 by up to 5°. In other embodiments, larger or smaller corrections may be made. With the load centered, the walking operation continues on its next cycle until the load is transported to its desired position.

Figure 30:
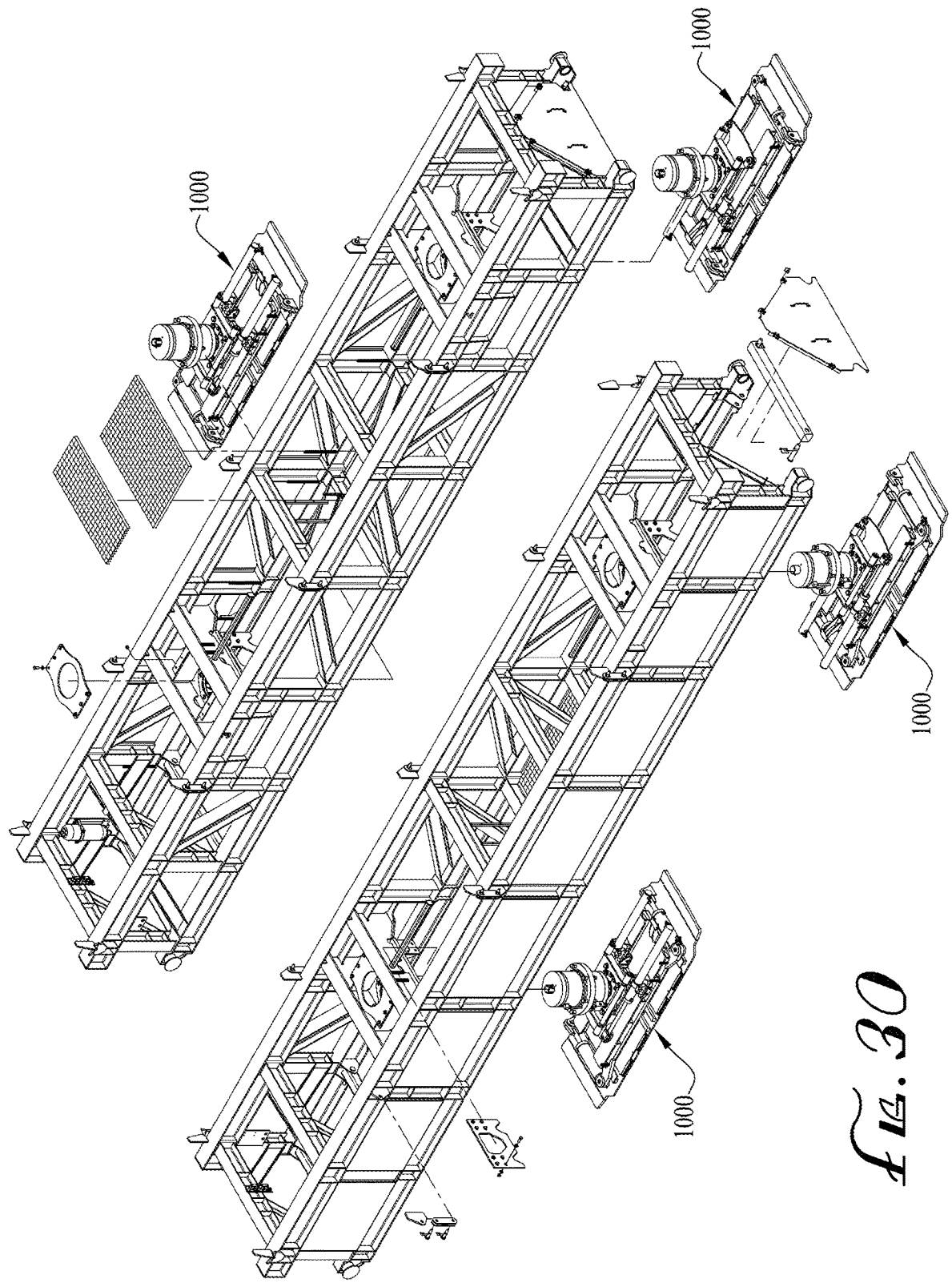
FIG. 30 is a top perspective view of a walking machine system according to an example embodiment, with four walking machine units, one disposed at each of the four corners of a rig structure.

FIG. 30 is a top perspective view of a walking machine system according to an example embodiment, with four walking machine units 1100, one disposed at each of the four corners of a rig structure 1400. It should be understood that in other embodiments, more or fewer walking machine units 1100 may be used depending on various factors, such as size and weight of the load.

Other embodiments are envisioned. Although the description above contains certain specific details, these details should not be construed as limiting the scope of the invention, but as merely providing illustrations of some embodiments/examples. It should be understood that subject matter disclosed in one portion herein can be combined with the subject matter of one or more of other portions herein as long as such combinations are not mutually exclusive or inoperable.

The terms and descriptions used herein are set forth by way of illustration only and not meant as limitations. It will be obvious to those having skill in the art that many changes may be made to the details of the above-described embodiments without departing from the underlying principles of the invention.

The invention claimed is:

1. A walking machine system for moving a load relative to a ground surface in one or more incremental steps via a plurality of lift assemblies, each lift assembly comprising:
   a lift mechanism operable to lift a load-bearing frame supporting the load;
   a foot pad assembly including a foot plate contacting the ground surface;
   a centering frame supported by the foot pad assembly, the centering frame including a first centering member and a second centering member offset from one another; and
   an alignment plate in operable communication with the centering frame, the alignment plate including a header end and an opposite footer end, the footer end further including a first notch and a second notch offset from one another, each of the first and second notches recessed relative to a peripheral edge of the footer end, and wherein the first notch engages the first centering member of the centering frame and the second notch engages the second centering member of the centering frame to align the foot pad assembly during transport of the load.

2. The walking machine system of claim 1, further comprising a translation assembly coupled to the lift mechanism and the foot pad assembly, the translation assembly comprising:
   a longitudinal drive assembly supporting the lift mechanism and operative for translating the lift mechanism and the load along a longitudinal direction; and
   a lateral drive assembly supporting the longitudinal drive assembly and operative for translating, independently of the longitudinal drive assembly, the longitudinal drive assembly, the lift mechanism and the load along a lateral direction.

3. The walking machine system of claim 2, further comprising:
   a first slide plate and a second slide plate each disposed on a top surface of the foot pad assembly, wherein the longitudinal drive assembly includes a roller assembly;
   a track housing for supporting the roller assembly and a longitudinal drive cylinder system for moving the roller assembly longitudinally along the track housing; and
   a lateral drive system for moving the track housing laterally in a sliding motion across the first and second slide plates.

4. The walking machine system of claim 3, wherein the first and second slide plates are each disposed flat on a central portion of the foot plate nesting between a plurality of retaining elements connected to the slide plate in a free-floating condition flat against the foot plate.

5. The walking machine system of claim 2, wherein the lateral drive assembly comprises a hydraulic piston and cylinder drive system.

6. The walking machine system of claim 2, wherein the lateral drive assembly comprises a drive system selected from the group consisting of: a hydraulic piston and cylinder drive, a jack screw drive, a rack and pinion assembly, a chain and sprocket drive, a gear drive, and an electric motor drive.

7. The walking machine system of claim 1, wherein the centering frame further includes a central opening through which the lift mechanism extends.

8. The walking machine system of claim 1, wherein the first notch and the second notch each include a slide surface and a seat.

9. The walking machine system of claim 8, wherein the slide surface of the first notch guides the first centering member toward the seat of the first notch, and wherein the slide surface of the second notch guides the second centering member toward the seat of the second notch to align the foot pad assembly during transport of the load.

10. The walking machine system of claim 1, the centering frame including a first support arm and a second support arm arranged parallel to one another, wherein the first centering member extends from the first support arm and the second centering member extends from the second support arm.

11. The walking machine system of claim 10, further comprising a removable wear cover coupled to each of the first and second centering members.

12. The walking machine system of claim 8, wherein the slide surface of each of the first and second notches of the alignment plate is an angled slide surface, and wherein the alignment plate and the first and second centering members of the centering frame cooperate to align the foot pad assembly by up to 5° during transport of the load.

13. The walking machine system of claim 8, wherein the first and second centering members each include a circular exterior profile, and wherein the seat of each of the first and second notches includes a radiused surface profile corresponding to the circular exterior profile of the first and second centering members.

14. The walking machine system of claim 1, wherein the alignment plate is coupled to the lift mechanism for movement therewith, the lift mechanism driving the alignment plate relative to the centering frame such that the alignment plate is cyclically moved into and out of engagement with the first and second centering members of the centering frame during transport of the load.

15. The walking machine system of claim 1, wherein the centering frame further includes a third centering member and a fourth centering member offset from one another, the system further comprising:
 a second alignment plate in operable communication with the centering frame, the second alignment plate including a header end and an opposite footer end, the footer end further including a third notch and a fourth notch offset from one another, each of the third and fourth notches recessed inwardly relative to a peripheral edge of the footer end, and wherein the third notch engages the third centering member of the centering frame and the fourth notch engages the fourth centering member of the centering frame to align the foot pad assembly during transport of the load.

16. The walking machine system of claim 15, wherein the first and third centering members are aligned with one another relative to the centering frame, and wherein the second and fourth centering members are aligned with one another relative to the centering frame.

17. The walking machine system of claim 16, the centering frame including a first support arm and a second support arm arranged parallel to one another, wherein the first and third centering members extend from the first support arm and the second and fourth centering members extend from the second support arm.

* * * * *